(12) United States Patent
Otoshi et al.

(10) Patent No.: US 7,927,521 B2
(45) Date of Patent: Apr. 19, 2011

(54) METHOD FOR PRODUCING CELLULOSE ACYLATE FILM AND OPTICAL COMPENSATION FILM FOR LIQUID CRYSTAL DISPLAY PLATE PRODUCED BY USING THE METHOD

(75) Inventors: Masaaki Otoshi, Fujinomiya (JP); Akihide Fujita, Fujinomiya (JP); Shinichi Nakai, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 618 days.

(21) Appl. No.: 11/916,203

(22) PCT Filed: May 29, 2006

(86) PCT No.: PCT/JP2006/311154
§ 371 (c)(1),
(2), (4) Date: Nov. 30, 2007

(87) PCT Pub. No.: WO2006/129825
PCT Pub. Date: Dec. 7, 2006

(65) Prior Publication Data
US 2010/0015395 A1    Jan. 21, 2010

(30) Foreign Application Priority Data
May 31, 2005    (JP) .................................. 2005-160002

(51) Int. Cl.
*B29D 11/00* (2006.01)
*B29D 7/01* (2006.01)
*B29C 67/20* (2006.01)
*B29C 47/38* (2006.01)
*B29C 55/00* (2006.01)

(52) U.S. Cl. ........ 264/1.6; 264/1.29; 264/1.34; 264/2.7; 264/172.19; 264/173.1; 264/175; 264/210.1; 264/210.7; 264/211.21; 264/288.4; 264/290.2

(58) Field of Classification Search ........................ None
See application file for complete search history.

(56) References Cited

U.S. PATENT DOCUMENTS

| | | | |
|---|---|---|---|
| 3,175,026 A * | 3/1965 | James | 264/210.1 |
| 3,327,033 A | 6/1967 | Koch et al. | |
| 5,219,510 A * | 6/1993 | Machell et al. | 264/210.6 |
| 6,773,649 B2 * | 8/2004 | Bourne et al. | 264/210.2 |
| 6,778,242 B1 * | 8/2004 | Murayama et al. | 349/117 |

(Continued)

FOREIGN PATENT DOCUMENTS

CN    1487969 A    4/2004

(Continued)

OTHER PUBLICATIONS

State Intellectual Property of People's Republic of China, "First Office Action," issued in connection with Chinese Patent Application No. 200680018805.2, dated May 15, 2009.

(Continued)

*Primary Examiner* — Jeffrey Wollschlager
(74) *Attorney, Agent, or Firm* — Sughrue Mion, PLLC

(57) ABSTRACT

According to the present invention, a cellulose acylate film having high thickness precision and no streaks can be formed by producing a film with a cellulose acylate resin by means of the polishing roller method, and a high-performance optical film, which is free from the retardation distribution, can be produced by subsequently stretching the cellulose acylate film thus obtained within a magnification range from 1 or more and 2.5 or less.

2 Claims, 3 Drawing Sheets

U.S. PATENT DOCUMENTS

| | | | |
|---|---|---|---|
| 6,814,914 B2 * | 11/2004 | Tasaka et al. | 264/217 |
| 6,913,714 B2 * | 7/2005 | Liu et al. | 264/1.34 |
| 2005/0045064 A1 | 3/2005 | Oya | |

FOREIGN PATENT DOCUMENTS

| | | |
|---|---|---|
| JP | 62216717 A | 9/1987 |
| JP | 2000-084995 A | 3/2000 |
| JP | 2000-263642 A | 9/2000 |
| JP | 2000-280315 A | 10/2000 |
| JP | 2000352620 * | 12/2000 |
| JP | 2002-311240 A | 10/2002 |
| JP | 2003315551 A | 11/2003 |
| JP | 2004-155101 A | 6/2004 |
| JP | 2005-104149 A | 4/2005 |

OTHER PUBLICATIONS

Notice of Reasons for Rejection, dated Aug. 31, 2010, issued in corresponding JP Application No. 2005-160002, 4 pages in English and Japanese.

* cited by examiner

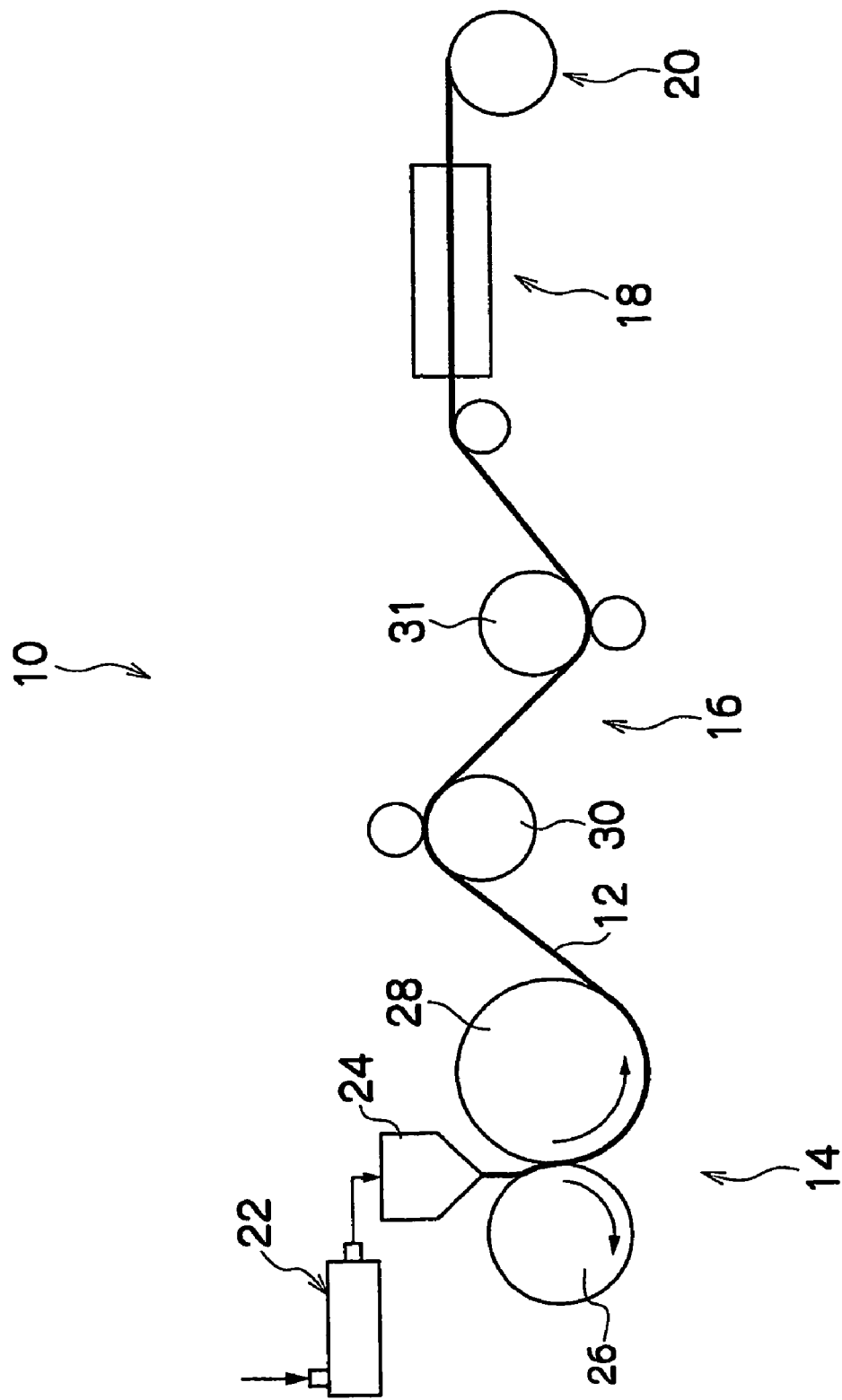

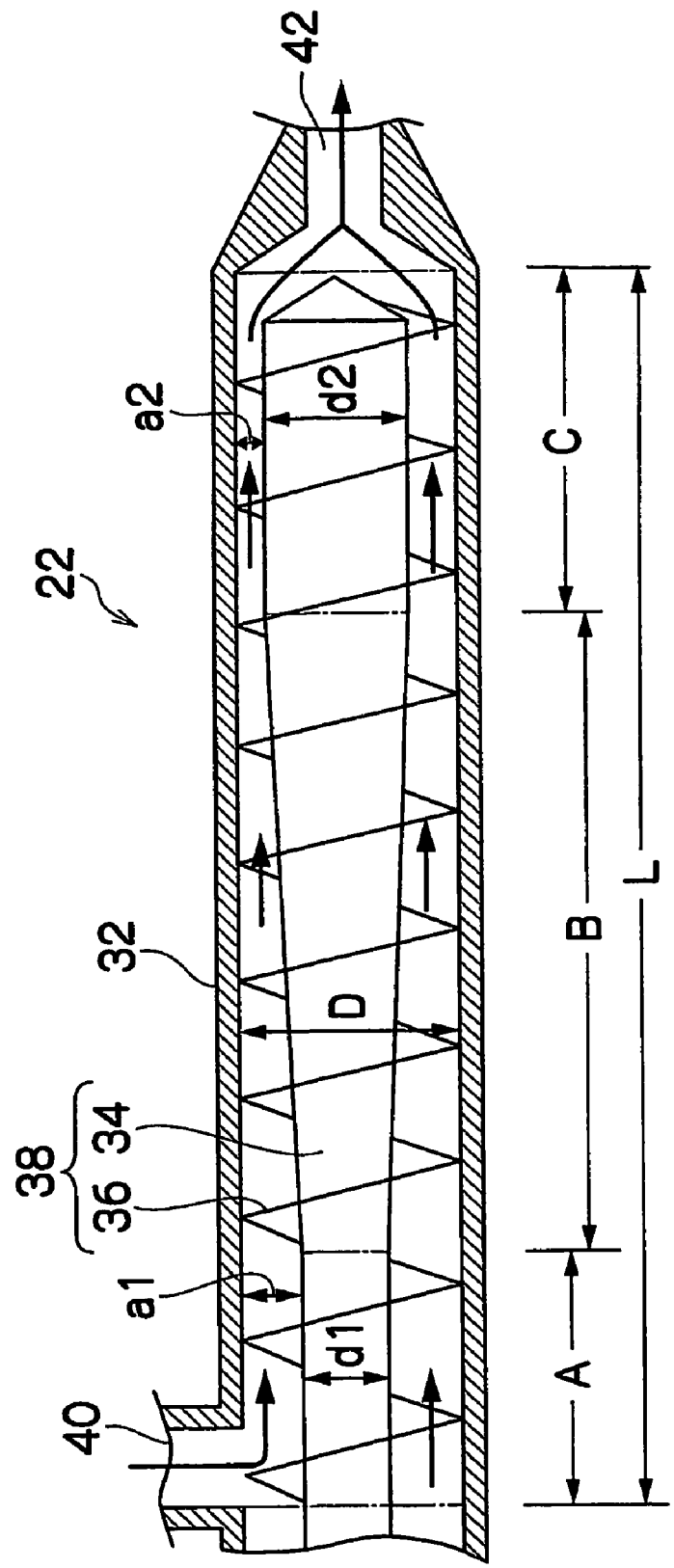

FIG.3

| TEST | SUBSTITUTION DEGREES IN CELLULOSE ACYLATE | | | | | MOLECULAR WEIGHT (Mn) | MELT FILM FORMABILITY | Tg | FILM FORMATION METHOD | COOLING ROLLERS | | | | LINE SPEED (m/min) |
|---|---|---|---|---|---|---|---|---|---|---|---|---|---|---|
| | ACETYL GROUP A | PROPIONATE GROUP B1 | BUTYRATE GROUP B2 | B (SUM OF B1 AND B2) | A+B | | | | | FIRST ROLLER | | SECOND ROLLER | | |
| | | | | | | | | | | SURFACE ROUGHNESS (nm) | ROLLER TEMPERATURE (°C) | SURFACE ROUGHNESS (nm) | ROLLER TEMPERATURE (°C) | |
| 1 | 0.35 | 2.5 | | 2.5 | 2.85 | 47,000 | SATISFACTORY | 118 | TOUCH ROLL METHOD | 25 | 113 | 25 | 113 | 20 |
| 2 | 0.5 | 2 | 0.2 | 2.2 | 2.7 | 47,000 | SATISFACTORY | 118 | TOUCH ROLL METHOD | 25 | 113 | 25 | 113 | 20 |
| 3 | 0.35 | | 2.5 | 2.5 | 2.85 | 45,000 | SATISFACTORY | 118 | TOUCH ROLL METHOD | 25 | 113 | 25 | 113 | 20 |
| 4 | 1.3 | 0.5 | | 0.5 | 1.8 | 47,000 | POOR | 127 | TOUCH ROLL METHOD | 25 | 122 | 25 | 122 | 20 |
| 5 | 1.8 | 0.2 | 0.2 | 0.4 | 2.2 | 47,000 | POOR | 125 | TOUCH ROLL METHOD | 25 | 120 | 25 | 120 | 20 |
| 6 | 0.35 | 2.5 | | 2.5 | 2.85 | 17,000 | POOR | 118 | TOUCH ROLL METHOD | 25 | 113 | 25 | 113 | 20 |
| 7 | 0.35 | 2.5 | | 2.5 | 2.85 | 100,000 | SATISFACTORY | 118 | TOUCH ROLL METHOD | 25 | 113 | 25 | 113 | 20 |
| 8 | 0.35 | 2.5 | | 2.5 | 2.85 | 42,000 | SATISFACTORY | 118 | TOUCH ROLL METHOD | 25 | 113 | 25 | 113 | 20 |
| 9 | 0.35 | 2.5 | | 2.5 | 2.85 | 47,000 | SATISFACTORY | 118 | TOUCH ROLL METHOD | 125 | 113 | 125 | 113 | 20 |
| 10 | 0.35 | 2.5 | | 2.5 | 2.85 | 47,000 | SATISFACTORY | 118 | TOUCH ROLL METHOD | 300 | 113 | 300 | 113 | 20 |
| 11 | 0.35 | 2.5 | | 2.5 | 2.85 | 47,000 | SATISFACTORY | 118 | CASTING DRUM METHOD | 25 | - | - | - | - |

| SHEET THICKNESS (μm) | FILM FORMATION CONDITIONS | | DSC HEAT ABSORPTION PEAK (J/g) | LONGITUDINAL STRETCHING | | TRANSVERSE STRETCHING | | THICKNESS AFTER STRETCHING (μm) | Re | | Rth | | STREAKS | HAZE VALUE (%) | YI VALUE |
|---|---|---|---|---|---|---|---|---|---|---|---|---|---|---|---|
| | ROLLER GAP (μm) | ROLLER LINEAR PRESSURE (kg/cm) | | STRETCHING PREHEATING TEMPERATURE (°C) | MAGNIFICATION | STRETCHING TEMPERATURE (°C) | MAGNIFICATION | | (nm) | FLUCTUATION RATE (%) | (nm) | FLUCTUATION RATE (%) | | | |
| 150 | 145 | 15 | 1.7 | 123 | 1.1 | 128 | 1.9 | 80 | 90 | 1 | 200 | 0.5 | GOOD | 1.3 | 3 |
| 150 | 145 | 15 | 1.7 | 123 | 1.1 | 128 | 1.9 | 80 | 89 | 1 | 197 | 0.5 | GOOD | 1.4 | 4 |
| 150 | 145 | 15 | 1.6 | 123 | 1.1 | 128 | 1.9 | 80 | 90 | 1 | 200 | 0.5 | GOOD | 1.4 | 5 |
| 150 | 145 | 15 | 2.1 | 132 | 1.1 | 137 | 1.9 | 80 | 80 | 1 | 190 | 0.5 | GOOD | 2 | 6 |
| 150 | 145 | 15 | 1.9 | 130 | 1.1 | 135 | 1.9 | 80 | 92 | 1 | 205 | 0.5 | GOOD | 1.6 | 8 |
| 150 | 145 | 15 | 1.9 | 123 | 1.1 | 128 | 1.9 | 80 | 85 | 6.5 | 188 | 5.5 | GOOD | 2.2 | 3 |
| 150 | 145 | 15 | 1.8 | 123 | 1.1 | 128 | 1.9 | 80 | 95 | 1 | 210 | 0.5 | GOOD | 1.5 | 8 |
| 150 | 145 | 15 | 1.7 | 123 | 1.5 | 123 | 2.7 | 60 | 128 | 2.8 | 250 | 2.5 | GOOD | 1.1 | 4 |
| 150 | 145 | 25 | 1.7 | 123 | 1.1 | 128 | 1.9 | 80 | 91 | 0.5 | 203 | 0.5 | GOOD | 3.5 | 3 |
| 150 | 145 | 40 | 1.7 | 123 | 1.1 | 128 | 1.9 | 80 | 92 | 1 | 204 | 0.5 | GOOD | 7.5 | 4 |
| 150 | - | - | 1.7 | 123 | 1.1 | 128 | 1.9 | 80 | 82 | 5.2 | 204 | 6.5 | POOREST | 2.7 | 4 |

METHOD FOR PRODUCING CELLULOSE ACYLATE FILM AND OPTICAL COMPENSATION FILM FOR LIQUID CRYSTAL DISPLAY PLATE PRODUCED BY USING THE METHOD

TECHNICAL FIELD

The present invention relates to a method for producing a cellulose acylate film, in particular, a method for producing a cellulose acylate film having a quality suitable for liquid crystal display devices.

BACKGROUND ART

Attempts have been made to realize a wider viewing angle in liquid crystal display elements by using, as a retardation film, a stretched cellulose acylate film in which in-plane retardation (Re) and across-the-thickness retardation (Rth) have been developed by stretching.

Examples of a process for producing such a cellulose acylate film may include a process in which a film is stretched in the longitudinal direction (longitudinal stretching), a process in which film is stretched in the transverse direction (transverse stretching), and a process in which film is stretched simultaneously in the longitudinal and transverse direction (simultaneous stretching). Among these processes, the longitudinal stretching has hitherto been used in many cases (see, for example, Japanese Patent Laid-Open No. 2002-311240).

DISCLOSURE OF THE INVENTION

When a unstretched cellulose acylate film is produced by means of a melt film-forming method, there is a problem such that a cellulose acylate resin can hardly be subjected to leveling because of its high melt viscosity. Consequently, a cellulose acylate film produced by means of a melt film-forming method is involved in problems such that in the film, streaks tends to be generated and the thickness precision tends to be degraded. Accordingly, there has been a problem that stretching of a cellulose acylate film produced by means of a melt film-forming method results in generation of the distributions of the retardations Re and Rth to inhibit attaining high optical properties.

The present invention has been achieved in view of the above described circumstances. An object of the present invention is to provide a method for producing a cellulose acylate film which process forms a cellulose acylate film that is free from streaks and high in thickness precision, stretches the film thus formed, so that a cellulose acylate film having high optical properties can be produced. Another object of the present invention is to provide an optical compensation film, produced with the thus stretched film, for liquid crystal display plate.

According to a first aspect of the present invention to attain the aforementioned object, there is provided a method for producing a cellulose acylate film, comprising: a film formation section in which a molten cellulose acylate resin is extruded from a die in a form of a sheet, and a film is formed by sandwiching the resin between a pair of rollers each having such surface properties that an arithmetic average roughness Ra is 100 nm or less to cool and solidify the resin; and a stretching section in which the film formed in the film formation section is stretched at least in one of a longitudinal direction and a transverse direction by a factor of 1 or more and 2.5 or less.

The present inventors have paid attention to the polishing roller method as a method for inhibiting the streaks generation and improving the thickness precision. The polishing roller method referred to herein means a method in which a resin extruded from a die is cooled while being sandwiched between a pair of polishing rollers, this method being characterized by being capable of inhibiting the streaks generation and improving the thickness precision, and on the other hand, by suffering a problem that residual strain tends to be generated in the film. Thus, there is a problem such that stretching of a film formed by means of the polishing roller method results in a significant stretching nonuniformity (stretching distribution), and a retardation distribution is thereby formed to inhibit the use of such a stretched film as an optical film. Consequently, the polishing roller method has never hitherto been applied to films to be stretched.

In view of these circumstances, the present inventors have obtained a finding that even when a film formed by means of the polishing roller method is stretched, high-performance optical properties can be obtained as long as the stretching extent falls within a magnification range from 1 or more and 2.5 or less, on the basis of the properties of the cellulose acylate resin such as the low intrinsic refractive index thereof and a low magnification stretching required therefor because of the satisfactory retardation development therein.

According to the first aspect, a high-performance optical film can be produced by forming a cellulose acylate film high in thickness precision and free from streaks by means of the polishing roller method and by subsequently stretching the thus formed film within a magnification range from 1 or more and 2.5 or less.

According to a second aspect of the present invention, there is provided the method for producing a cellulose acylate film according to the first aspect, wherein the cellulose acylate resin has a molecular weight of 20,000 to 80,000 and the substitution degrees of the acyl groups satisfy the relations $2.0 \leq A+B \leq 3.0$, $0 \leq A \leq 2.0$ and $1.2 \leq B \leq 2.9$ wherein A represents the substitution degree of the acetyl group and B represents the total sum of the substitution degrees of the acyl groups each having 3 to 7 carbon atoms. A cellulose acylate film satisfying such substitution degrees is characterized by being low in melting point, easy to stretch and excellent in prevention of moisture, permitting obtaining a stretched cellulose acylate film excellent as a functional film such as a retardation film in the liquid crystal display elements.

According to a third aspect of the present invention, there is provided the method for producing a cellulose acylate film according to the first or second aspect, wherein the film thickness is 30 to 300 μm, the in-plane retardation Re is 0 nm or more and 500 nm or less, and the thickness direction retardation Rth is 30 nm or more and 500 nm or less. The cellulose acylate film characterized as described above can be produced by means of the above described method.

According to a fourth aspect of the present invention, there is provided an optical compensation film for liquid crystal display plate, comprising a stretched film produced by means of the process according to any one of the first to third aspects as a substrate. The stretched films produced by means of the methods according to the first to third aspects have high optical properties to be suitable for optical compensation films for liquid crystal display plate.

According to the present invention, a cellulose acylate film high in thickness precision and free from streaks can be formed by producing a film with a cellulose acylate resin by means of the polishing roller method, and a high-performance optical film free from the retardation distribution can be produced by subsequently stretching the cellulose acylate film thus obtained within a magnification range from 1 or more and 2.5 or less.

BRIEF DESCRIPTION OF THE DRAWINGS

FIG. 1 is a schematic diagram illustrating a configuration of an apparatus for producing a film to which apparatus the present invention is applied;

FIG. 2 is a schematic view illustrating a configuration of an extruder; and

FIG. 3 is a table describing examples of the present invention.

DESCRIPTION OF REFERENCE NUMERALS

10 . . . Apparatus for producing film
12 . . . Cellulose acylate film
14 . . . Film formation section
16 . . . Longitudinal stretching section
18 . . . Transverse stretching section
20 . . . Winding-up section
22 . . . Extruder
24 . . . Die
26 . . . Polishing roller
28 . . . Polishing roller

BEST MODE FOR CARRYING OUT THE INVENTION

Hereinafter, preferred embodiments of the method for producing a cellulose acylate film according to the present invention will be described with reference to the accompanying drawings.

FIG. 1 is a schematic diagram showing one example of apparatus for producing a thermoplastic film. As shown in FIG. 1, the producing apparatus 10 mainly includes: a film forming section 14 where an unstretched cellulose acylate film 12 is formed; a longitudinal stretching section 16 where the cellulose acylate film 12 having been formed in the film forming section 14 is stretched longitudinally; a transverse stretching section 18 where the cellulose acylate film 12 having been stretched longitudinally is stretched transversely; and a winding-up section 20 where the stretched cellulose acylate film 12 is wound up.

In the film formation section 14, a cellulose acylate resin melted in an extruder 22 is discharged from a die 24 in the form of a sheet to be fed between a pair of rotating polishing rollers 26 and 28. The resin sheet is cooled and solidified on the polishing roller 28 to form a cellulose acylate film 12. Then, the cellulose acylate film 12 is peeled from the polishing roller 28, thereafter conveyed sequentially to the longitudinal stretching section 16 and the transverse stretching section 18 to be stretched, and then wound up in the form of a roll in the winding-up section 20. Thus, a stretched cellulose acylate film 12 is produced. Hereinafter, each of the sections will be described in detail.

FIG. 2 shows a single-screw extruder 22. As shown in FIG. 2, a single screw 38 including a screw shaft 34 and a flight 36 is located in a cylinder 32, and a cellulose acylate resin is fed to the cylinder 32 from a hopper not shown in the figure via a feed opening 40. The inside of the cylinder 32 consists of: a feeding section where the cellulose acylate resin fed through the feed opening 40 is transported a fixed amount (the area shown by character A); a compressing section where the cellulose acylate resin is kneaded and compressed (the area shown by character B); and a measuring section where the kneaded and compressed cellulose acylate resin is measured (the area shown by character C). The cellulose acylate resin molten by the extruder 22 is continuously fed to the die 24 from a discharge 42.

The screw compression ratio of the extruder 22 is set to 2.5 to 4.5 and L/D to 20 to 70. The term "screw compression ratio" herein used means the volume ratio of the feeding section A to the measuring section C, in other words, the volume per unit length of the feeding section A÷the volume per unit length of the measuring section C, and it is calculated using the outside diameter d1 of the screw shaft 34 of the feeding section A, the outside diameter d2 of the screw shaft 34 of the measuring section C, the diameter a1 of the flight channel of the feeding section A and the diameter a2 of the flight channel of the measuring section C. The term "L/D" herein used means the ratio of the length (L) to the inside diameter (D) of the cylinder shown in FIG. 2. The extrusion temperature (the outlet temperature of the extruder) is set to 190 to 240° C. When the temperature inside the extruder 22 is higher than 240° C., a refrigerator (not shown in the figure) should be provided between the extruder 22 and the die 24.

The extruder 22 may be either a single-screw extruder or a twin-screw extruder. However, if the screw compression ratio is as low as less than 2.5, the thermoplastic resin is not fully kneaded, thereby causing an unmolten part, or the magnitude of heat evolution by shear stress is too small to sufficiently fuse crystals, thereby making fine crystals more likely to remain in the formed cellulose acylate film. Furthermore, the cellulose acylate film is made more likely to include air bubbles. Thus, in stretching of the cellulose acylate film 12, the remaining crystals inhibit the stretchability of the film, whereby the degree of film orientation cannot be sufficiently increased. Conversely, if the screw compression ratio is as high as more than 4.5, the magnitude of heat evolution by shear stress is so large that the resin becomes more likely to deteriorate by heat, which makes the formed cellulose acylate film more likely to yellow. Further, too large shear stress causes molecule breakage, which results in decrease in molecular weight, and hence in mechanical strength of the film. Accordingly, to make the formed cellulose acylate film less likely to yellow and less likely to break in stretching, the screw compression ratio is preferably in the range of 2.5 to 4.5, more preferably in the range of 2.8 to 4.2, and particularly preferably in the range of 3.0 to 4.0.

The L/D as low as less than 20 causes insufficient melting or insufficient kneading, which makes fine crystals more likely to remain in the formed cellulose acylate film, like the case where the compression ratio is too low. Conversely, the L/D as high as more than 50 makes too long the residence time of the cellulose acylate resin in the extruder 22, which makes the resin more likely to deteriorate. Too long a residence time may cause molecule breakage, which results in decrease in molecular weight, and hence in mechanical strength of the film. Accordingly, to make the formed cellulose acylate film less likely to yellow and less likely to break in stretching, the L/D is preferably in the range of 20 to 70, more preferably in the range of 22 to 45, and particularly preferably in the range of 24 to 40.

If the extrusion temperature is as low as lower than 190° C., crystals are not sufficiently melted, which makes fine crystals more likely to remain in the formed cellulose acylate film. As a result, when stretching the cellulose acylate film, the remaining crystals inhibit the stretchability of the film, whereby the degree of film orientation cannot be sufficiently increased. Conversely, if the extrusion temperature is as high as higher than 240° C., the cellulose acylate resin deteriorates, which causes the degree of yellow (YI value) to increase.

Accordingly, to make the formed cellulose acylate film less likely to yellow and less likely to break in stretching, the extrusion temperature is preferably in the range of 190° C. to 240° C., more preferably in the range of 195° C. to 235° C., and particularly preferably in the range of 200° C. to 230° C.

A cellulose acylate resin is melted using the extruder 22 constructed as above, and the molten resin is continuously fed to the die 24 and discharged in the form of a sheet from the leading edge (bottom end) of the die 24. The discharged molten resin is fed between the pair of polishing rollers 26 and 28 (see FIG. 1).

The pair of polishing rollers 26 and 28 are disposed with a predetermined gap (for example, from 0.03 to 0.3 mm) and are constructed so as to sandwich and pressurize the molten resin at a linear pressure of 0.5 to 50 kg/cm.

Each of the polishing rollers 26 and 28 has a surface made of a metallic material, the surface is mirror finished or nearly mirror finished, and the arithmetic average roughness Ra of the surface is set at 100 nm or less, preferably at 50 nm or less and more preferably at 25 nm or less. Each of the polishing rollers 26 and 28 is constructed in such a way that the surface temperature thereof can be controlled; for example, circulation of a heating medium such as water inside each of the polishing rollers 26 and 28 permits controlling the surface temperature thereof.

The pair of polishing rollers 26 and 28 each are connected to a rotation driving device such as a motor, and are made to rotate at approximately the same speed as the speed of the molten resin discharged from the die 24 as found at a position for the molten resin to touch one of the polishing rollers 26 and 28.

The polishing roller 26 of the pair of polishing rollers 26 and 28 is formed to be smaller in diameter than the other polishing roller 28. The aforementioned die 24 is disposed at a position so as for the discharge opening thereof to be closer to the polishing roller 26 than to the gap between the polishing rollers 26 and 28.

The surface of one of the polishing rollers 26 and 28 may be formed with a resin. Such a surface made of a resin permits planar pressing of the molten resin when the molten resin is sandwiched and pressurized by the pair of polishing rollers 26 and 28, resulting in inhibition of the residual strain generation in the film at the time of the film formation.

According to the film formation section 14 configured as described above, the discharge of the molten resin from the die 24 results in a formation of a liquid pool (bank) of the discharged molten resin above the gap between the pair of polishing rollers 26 and 28. Thus, the molten resin is sandwiched and pressurized by the pair of polishing rollers 26 and 28 so as to be a sheet while being controlled to be uniform in thickness, and the sheet thus formed is cooled while being wound on the polishing roller 28. Thereafter, the sheet is peeled from the surface of the polishing roller 28 and transferred to the subsequent, longitudinal stretching section 16.

The stretching process in which the cellulose acylate film 12 formed in the film forming section 14 undergoes stretching and is formed into a stretched cellulose acylate film 12 will be described below.

Stretching of the cellulose acylate film 12 is performed so as to orient the molecules in the cellulose acylate film 12 and develop the in-plane retardation (Re) and the retardation across the thickness (Rth) in the film. The retardations Re and Rth are obtained from the following equations.

$$Re(\text{nm}) = |n(MD) - n(TD)| \times T \text{ (nm)}$$

$$Rth(\text{nm}) = |\{(n(MD) + n(TD))/2\} - n(TH)| \times T \text{ (nm)}$$

The characters, n(MD), n(TD) and n(TH), in the above equations indicate the refractive indexes across the length, across the width and across the thickness, respectively, and the character T the thickness in nm.

As shown in FIG. 1, the cellulose acylate film 12 is first stretched in the longitudinal direction in the longitudinal stretching section 16. In the longitudinal stretching section 16, the cellulose acylate film 12 is preheated and the cellulose acylate film 12 in the heated state wound around the two nip rolls 30, 32. The nip roll 32 on the outlet side conveys the cellulose acylate film 12 at higher conveying speeds than the nip roll 30 on the inlet side, whereby the cellulose acylate film 12 is stretched in the longitudinal direction.

In the longitudinal stretching section 16, the preheating temperature is preferably Tg−40° C. or higher and Tg+60° C. or lower, more preferably Tg−20° C. or higher and Tg+40° C. or lower, and furthermore preferably Tg or higher and Tg+30° C. or lower. In the longitudinal stretching section 16, the stretching temperature is Tg or higher and Tg+60° C. or lower, more preferably Tg+2° C. or higher and Tg+40° C. or lower, and furthermore preferably Tg+5° C. or higher and Tg+30° C. or lower. The longitudinal stretching magnification is preferably 1.0 or more and 2.5 or less and further preferably 1.1 or more and 2 or less.

The cellulose acylate film 12 having been stretched longitudinally is fed to the transverse stretching section 18 where it is stretched across the width. In the transverse stretching section 18, a tenter is suitably used. The tenter stretches the cellulose acylate film 12 in the transverse direction while fastening both side ends of the film 12 with clips. This transverse stretching can further increase the retardation Rth.

The transverse stretching is preferably carried out by means of the tenter, and the stretching temperature is preferably Tg or higher and Tg+60° C. or lower, more preferably Tg+2° C. or higher and Tg+40° C. or lower, and furthermore preferably Tg+4° C. or higher and Tg+30° C. or lower. The stretching magnification is preferably 1.0 or more and 2.5 or less and further preferably 1.1 or more and 2.0 or less. It is preferable to carry out relief in any of the longitudinal and transverse directions or in both directions after the transverse stretching. Such relief can narrow the transverse distribution of the phase retardation axis.

Owing to such stretching, Re is 0 nm or more and 500 nm or less, more preferably 10 nm or more and 400 nm or less and furthermore preferably 15 nm or more and 300 nm or less; and Rth is 30 nm or more and 500 nm or less, more preferably 50 nm or more and 400 nm or less and furthermore preferably 70 nm or more and 350 nm or less.

Of the stretched cellulose acylate films described above, those satisfy the formula, Re≦Rth, are more preferable and those satisfy the formula, Re×2≦Rth, are much more preferable. To realize such a high Rth and a low Re, it is preferable to stretch the cellulose acylate film having been stretched longitudinally in the transverse direction (across the width). Specifically, in-plane retardation (Re) represents the difference between the orientation in the longitudinal direction and the orientation in the transverse direction, and if the stretching is performed not only in the longitudinal direction, but in the transverse direction—the direction perpendicular to the longitudinal direction, the difference between the orientation in the longitudinal direction and the orientation in the transverse direction can be decreased, and hence the in-plane retardation (Re). And at the same time, stretching in both the longitudinal and transverse directions increases the area magnification, and therefore, the orientation across the thickness increases with decrease in the thickness, which in turn increases Rth.

Further, fluctuations in Re and Rth in the transverse direction and the longitudinal direction depending on locations are kept preferably 5% or less, more preferably 4% or less and much more preferably 3% or less.

According to the present embodiment as described above, the cellulose acylate film 12 free from residual strain can be produced in the film formation section 14, and the cellulose acylate film 12 is subjected to stretching in the longitudinal direction and the transverse direction by a factor of 1.0 or more and 2.5 or less, so that a cellulose acylate film 12 free from stretching distribution can be produced.

The cellulose acylate film 12 having been stretched is wound up in the form of a roll in the winding-up section 20 in FIG. 1. In this winding up, the winding-up tension of the cellulose acylate film 12 is preferably set at 0.02 kg/mm² or less. The winding-up tension set to fall within such a range permits winding up of the stretched cellulose acylate film 12 without generating any retardation distribution in the stretched cellulose acylate film 12.

Hereinafter, detailed description will be made on the cellulose acylate resin suitable for the present invention, the film formation method of the unstretched cellulose acylate film 12, and the processing method of the cellulose acylate film 12, according to the sequence of procedures.

(Cellulose Acylate Resin)

The cellulose acylate to be used in the present invention is preferably characterized as follows. Here, A represents the substitution degree of the acetyl group and B represents the total sum of the substitution degrees of the acyl groups each having 3 to 7 carbon atoms.

$$2.0 \leq A+B \leq 3.0 \quad (1)$$

$$0 \leq A \leq 2.0 \quad (2)$$

$$1.2 \leq B \leq 2.9 \quad (3)$$

In the cellulose acylate of the present invention, as shown by the above formula (1), A+B is characterized by satisfying the relation that A+B is from 2.0 to 3.0; A+B is preferably from 2.4 to 3.0 and more preferably from 2.5 to 2.95. When A+B is less than 2.0, the hydrophilicity of the cellulose acylate is increased and the moisture permeability of the film is unpreferably increased.

It is to be noted that the numerical value range defined by using "from" and "to" means that the range includes the numerical value following "from" and the numerical value following "to" as the lower and upper limits, respectively.

As shown by the above formula (2), A is characterized by satisfying the relation that A is from 0 to 2.0; A is preferably from 0.05 to 1.8 and more preferably from 0.1 to 1.6.

As shown by the above formula (3), B is characterized by satisfying the relation that B is from 1.2 to 2.9; B is preferably from 1.3 to 2.9, more preferably from 1.4 to 2.9 and furthermore preferably from 1.5 to 2.9.

When the half or more of B is the propionate group, it is preferable that:

$$2.4 \leq A+B \leq 3.0$$

$$2.0 \leq B \leq 2.9;$$

when less than the half of B is the propionate group, it is preferable that:

$$2.4 \leq A+B \leq 3.0$$

$$1.3 \leq B \leq 2.5.$$

when the half or more of B is the propionate group, it is further preferable that:

$$2.5 \leq A+B \leq 2.95$$

$$2.4 \leq B \leq 2.9;$$

when less than the half of B is the propionate group, it is further preferable that:

$$2.5 \leq A+B \leq 2.95$$

$$1.4 \leq B \leq 2.0.$$

The present invention is characterized in that the substitution degree of the acetyl group among the acyl groups is made relatively smaller, and the total sum of the substitution degrees of the propionate group, butyrate group, pentanoyl group and hexanoyl group is made relatively larger. Consequently, the fluctuations of Re and Rth with time after stretching can be made smaller. This is because by relatively increasing the proportion of these groups longer than the acetate group, the flexibility of the film is improved and the stretchability of the film is improved, so that the orientation of the cellulose acylate molecules is made to be hardly disturbed as the stretching is increased, and the fluctuations of the thus attained Re and Rth with time are decreased. On the other hand, when the lengths of the acyl groups are made longer than those of the groups cited above, unpreferably the glass transition temperature (Tg) and the elasticity modulus are degraded. Accordingly, the propionate group, butyrate group, pentanoyl group and hexanoyl group all longer than the acetyl group are preferable, and the propionate group and butyrate group are more preferable.

The fundamental principles of the process for synthesizing these cellulose acylates are described by Migita et al. in "Mokuzai Kagaku (Wood Chemistry)," pp. 180-190 (Kyoritsu Shuppan, 1968). A typical synthesis method is a liquid phase acetylation method involving a carboxylic anhydride, acetic acid and sulfuric acid as catalyst. Specifically, a cellulose raw material such as cotton linter and wood pulp is pretreated with an appropriate amount of acetic acid, and then subjected to esterification by placing the pretreated cellulose raw material in a precooled liquid mixture for carboxylation to thereby synthesize a perfect cellulose acylate (the sum of the substitution degrees of the acyl groups at the 2-, 3- and 6-position amounting to almost 3.00). The liquid mixture for carboxylation generally contains acetic acid as solvent, a carboxylic anhydride as an esterifying agent and sulfuric acid as catalyst. It is a common practice to use the carboxylic anhydride in a stoichiometrically excess amount in relation to the sum of the amount of the cellulose to be reacted with the carboxylic anhydride and the amount of the moisture in the reaction system. After completion of the acylation reaction, an aqueous solution of a neutralizing agent (for example, the carbonate, acetate or oxide of calcium, magnesium, iron, aluminum or zinc) is added to hydrolyze the excessive carboxylic anhydride remaining in the reaction system and neutralize a fraction of the esterification catalyst. Then, the obtained perfect cellulose acylate is saponified and aged by maintaining at from 50 to 90° C. in the presence of a small amount of an acetylation catalyst (in general, the remaining sulfuric acid) to thereby convert the perfect cellulose acylate into a cellulose acylate having a desired substitution degree of acyl and a desired polymerization degree. When the desired cellulose acylate is obtained, the catalyst remaining in the reaction system is completely neutralized by using such a neutralizing agent as described above. Alternatively, the cellulose acylate solution is poured, without being neutralized, into water or a diluted sulfuric acid (or water or a diluted sulfuric acid is poured into the cellulose acylate solution) to separate the cellulose acylate; the separated cellulose acylate is washed and subjected to a stabilization treatment to yield the desired cellulose acylate.

The number average molecular weight of the cellulose acylate to be preferably used in the present invention is required to be from 20,000 to 80,000, preferably from 30,000 to 75,000 and further preferably from 40,000 to 70,000. When the molecular weight is smaller than 20,000, the mechanical properties of the film are insufficient, and unpreferably the film tends to crack. On the other hand, when the molecular weight is large to exceed 80,000, the melt viscosity at the time of melt film-forming unpreferably becomes too high. The control of the average polymerization degree can also be attained by removing low-molecular weight components. When the low-molecular weight components are removed, the average molecular weight (polymerization degree) is increased, but the viscosity becomes lower than those of common cellulose acylates; therefore the removal of the low-molecular weight components is useful. The removal of the low-molecular weight components can be carried out by washing the cellulose acylate with an appropriate organic solvent. Moreover, the molecular weight can also be controlled by the polymerization method. For example, when a cellulose acylate containing smaller amounts of low-molecular weight components is produced, the amount of the sulfuric acid catalyst in the acetylation reaction is preferably controlled to be from 0.5 to 25 parts by weight in relation to 100 parts by weight of the cellulose. The control of the amount of the sulfuric acid catalyst to fall within this range makes it possible to synthesize a cellulose acylate that is also satisfactory from the viewpoint of the molecular weight distribution (a cellulose acylate having a uniform molecular weight distribution).

In the cellulose acylate to be preferably used in the present invention, the ratio of the weight average molecular weight Mw to the number average molecular weight Mn, namely, Mw/Mn, is preferably from 1.5 to 5.5, further preferably from 2.0 to 5.0, particularly preferably from 2.5 to 5.0 and most preferably from 3.0 to 5.0.

These cellulose acylates may be used singly or as mixtures of two or more thereof. Alternatively, a polymer component other than the cellulose acylate may be optionally mixed together. The polymer component to be mixed with the cellulose acylate preferably has an excellent compatibility with the cellulose acylate, and the film produced by mixing the polymer component has a transmittance of preferably 80% or more, further preferably 90% or more and furthermore preferably 92% or more.

In the present invention, addition of a plasticizer can preferably decrease the crystal melting point (Tm) of the cellulose acylate, and can also preferably alleviate the fluctuations of Re and Rth with time. This is because the addition of a plasticizer hydrophobilizes the cellulose acylate, and can thereby suppress the relaxation of the stretching orientation of the cellulose acylate molecules due to water absorption. No particular constraint is imposed on the molecular weight of the plasticizer to be used, and the plasticizer may have a high or low molecular weight. Examples of the plasticizer may include phosphoric acid esters, alkyl phthalyl alkyl glycolates, carboxylic acid esters and fatty acid esters of polyhydric alcohols. The form of each of these plasticizers may be solid or oily. In other words, no particular constraint is imposed on the melting point or the boiling point of each of these plasticizers. When the melt film-forming is carried out, a nonvolatile plasticizer can be particularly preferably used.

Specific examples of the phosphoric acid ester may include triphenyl phosphate, tributyl phosphate, tributoxyethyl phosphate, tricresyl phosphate, trioctyl phosphate, trinaphthyl phosphate, trixylyl phosphate, tri-o-biphenyl phosphate, cresyl diphenyl phosphate, octyl diphenyl phosphate, biphenyl diphenyl phosphate, and 1,4-phenylene tetraphenyl phosphate. Alternatively, phosphoric acid ester plasticizers described in the claims 3 to 7 of Japanese Patent Laid-Open No. 6-501040 are also preferably used.

Examples of the alkyl phthalyl alkyl glycolates may include methyl phthalyl methyl glycolate, ethyl phthalyl ethyl glycolate, propyl phthalyl propyl glycolate, butyl phthalyl butyl glycolate, octyl phthalyl octyl glycolate, methyl phthalyl ethyl glycolate, ethyl phthalyl methyl glycolate, ethyl phthalyl propyl glycolate, methyl phthalyl butyl glycolate, ethyl phthalyl butyl glycolate, butyl phthalyl methyl glycolate, butyl phthalyl ethyl glycolate, propyl phthalyl butyl glycolate, butyl phthalyl propyl glycolate, methyl phthalyl octyl glycolate, ethyl phthalyl octyl glycolate, octyl phthalyl methyl glycolate, and octyl phthalyl ethyl glycolate.

Examples of the carboxylic acid esters may include: phthalates such as dimethyl phthalate, diethyl phthalate, dibutyl phthalate, dioctyl phthalate and diethylhexyl phthalate; citrates such as acetyltrimethyl citrate, acetyltriethyl citrate and acetyltributyl citrate; adipates such as dimethyl adipate, dibutyl adipate, diisobutyl adipate, bis(2-ethylhexyl) adipate, diisodecyl adipate, and bis(butyldiglycol) adipate; aromatic polycarboxylic acid esters such as tetraoctyl pyromellitate, trioctyl trimellitate; aliphatic polycarboxylic acid esters such as dibutyl adipate, dioctyl adipate, dibutyl sebacate, dioctyl sebacate, diethyl azelate, dibutyl azelate and dioctyl azelate; fatty acid esters of polyhydric alcohols such as glycerin triacetate, diglycerin tetraacetate, acetylated glyceride, mono glycerides and diglycerides. Additionally, butyl oleate, methyl acetyl ricinoleate, dibutyl sebacate, triacetin and the like are preferably used singly or in combinations.

Examples of the plasticizers may also include the following high molecular weight plasticizers: aliphatic polyesters each composed of a glycol and a dibasic acid such as polyethylene adipate, polybutylene adipate, polyethylene succinate, and polybutylene succinate; aliphatic polyesters each composed of an oxycarboxylic acid such as polylactic acid and polyglycolic acid; aliphatic polyesters each composed of a lactone such as polycaprolactone, polypropiolactone and polyvalerolactone; and vinyl polymers such as polyvinyl pyrrolidone. As the plasticizer, these high molecular weight plasticizers may be used singly or in combinations with low molecular weight plasticizers.

Examples of polyhydric alcohol plasticizers may include the following compounds that are satisfactory in compatibility with fatty acid esters of cellulose and exhibit remarkable thermoplastic effect: glycerin ester compounds such as glycerin esters and diglycerin esters; polyalkylene glycols such as polyethylene glycol and polypropylene glycol; and those compounds in each of which a polyalkylene glycol has acyl groups bonded to the hydroxy groups thereof.

Specific examples of glycerin esters include: not limited to, glycerin diacetate stearate, glycerin diacetate palmitate, glycerin diacetate mystirate, glycerin diacetate laurate, glycerin diacetate caprate, glycerin diacetate nonanate, glycerin diacetate octanoate, glycerin diacetate heptanoate, glycerin diacetate hexanoate, glycerin diacetate pentanoate, glycerin diacetate oleate, glycerin acetate dicaprate, glycerin acetate dinonanate, glycerin acetate dioctanoate, glycerin acetate diheptanoate, glycerin acetate dicaproate, glycerin acetate divalerate, glycerin acetate dibutyrate, glycerin dipropionate caprate, glycerin dipropionate laurate, glycerin dipropionate mystirate, glycerin dipropionate palmitate, glycerin dipropionate stearate, glycerin dipropionate oleate, glycerin tributyrate, glycerin tripentanoate, glycerin monopalmitate, glycerin monostearate, glycerin distearate, glycerin propionate laurate, and glycerin oleate propionate. Either any one of these glycerin esters alone or two or more of them in combination may be used.

Of these examples, preferable are glycerin diacetate caprylate, glycerin diacetate pelargonate, glycerin diacetate caprate, glycerin diacetate laurate, glycerin diacetate myristate, glycerin diacetate palmitate, glycerin diacetate stearate, and glycerin diacetate oleate.

Specific examples of diglycerin esters include: not limited to, mixed acid esters of diglycerin, such as diglycerin tetraacetate, diglycerin tetrapropionate, diglycerin tetrabutyrate, diglycerin tetravalerate, diglycerin tetrahexanoate, diglycerin tetraheptanoate, diglycerin tetracaprylate, diglycerin tetrapelargonate, diglycerin tetracaprate, diglycerin tetralaurate, diglycerin tetramystyrate, diglycerin tetramyristylate, diglycerin tetrapalmitate, diglycerin triacetate propionate, diglycerin triacetate butyrate, diglycerin triacetate valerate, diglycerin triacetate hexanoate, diglycerin triacetate heptanoate, diglycerin triacetate caprylate, diglycerin triacetate pelargonate, diglycerin triacetate caprate, diglycerin triacetate laurate, diglycerin triacetate mystyrate, diglycerin triacetate palmitate, diglycerin triacetate stearate, diglycerin triacetate oleate, diglycerin diacetate dipropionate, diglycerin diacetate dibutyrate, diglycerin diacetate divalerate, diglycerin diacetate dihexanoate, diglycerin diacetate diheptanoate, diglycerin diacetate dicaprylate, diglycerin diacetate dipelargonate, diglycerin diacetate dicaprate, diglycerin diacetate dilaurate, diglycerin diacetate dimystyrate, diglycerin diacetate dipalmitate, diglycerin diacetate distearate, diglycerin diacetate dioleate, diglycerin acetate tripropionate, diglycerin acetate tributyrate, diglycerin acetate trivalerate, diglycerin acetate trihexanoate, diglycerin acetate triheptanoate, diglycerin acetate tricaprylate, diglycerin acetate tripelargonate, diglycerin acetate tricaprate, diglycerin acetate trilaurate, diglycerin acetate trimystyrate, diglycerin acetate trimyristylate, diglycerin acetate tripalmitate, diglycerin acetate tristearate, diglycerin acetate trioleate, diglycerin laurate, diglycerin stearate, diglycerin caprylate, diglycerin myristate, and diglycerin oleate. Either any one of these diglycerin esters alone or two or more of them in combination may be used.

Of these examples, diglycerin tetraacetate, diglycerin tetrapropionate, diglycerin tetrabutyrate, diglycerin tetracaprylate and diglycerin tetralaurate are preferably used.

Specific examples of polyalkylene glycols include: not limited to, polyethylene glycols and polypropylene glycols having an average molecular weight of 200 to 1000. Either any one of these examples or two of more of them in combination may be used.

Specific examples of compounds in which an acyl group is bound to the hydroxyl group of polyalkylene glycol include: not limited to, polyoxyethylene acetate, polyoxyethylene propionate, polyoxyethylene butyrate, polyoxyethylene valerate, polyoxyethylene caproate, polyoxyethylene heptanoate, polyoxyethylene octanoate, polyoxyethylene nonanate, polyoxyethylene caprate, polyoxyethylene laurate, polyoxyethylene myristylate, polyoxyethylene palmitate, polyoxyethylene stearate, polyoxyethylene oleate, polyoxyethylene linoleate, polyoxypropylene acetate, polyoxypropylene propionate, polyoxypropylene butyrate, polyoxypropylene valerate, polyoxypropylene caproate, polyoxypropylene heptanoate, polyoxypropylene octanoate, polyoxypropylene nonanate, polyoxypropylene caprate, polyoxypropylene laurate, polyoxypropylene myristylate, polyoxypropylene palmitate, polyoxypropylene stearate, polyoxypropylene oleate, and polyoxypropylene linoleate. Either any one of these examples or two or more of them in combination may be used.

The addition amount of the plasticizer is preferably from 0 to 20% by weight, more preferably from 2 to 18% by weight and most preferably from 4 to 15% by weight.

When the addition amount of the plasticizer exceeds 20% by weight, the thermal fluidity of the cellulose acylate becomes satisfactory, but the plasticizer sometimes bleeds from the surface of a film made by melt film-forming, or the glass transition temperature Tg as an indicator of the heat resistance is lowered.

In the present invention, if needed, as the stabilizers for inhibiting thermal degradation and coloration, phosphite compounds, phosphorous acid ester compounds, phosphates, thiophosphates, weak organic acids, epoxy compounds and the like may be added singly or as mixtures of two or more thereof, within such ranges that do not impart the required performances. Specific examples of more preferably usable phosphite stabilizers may include the compounds described in the paragraphs from [0023] to [0039] in Japanese Patent Laid-Open No. 2004-182979. Specific examples of usable phosphorous acid ester stabilizers may include the compounds described in Japanese Patent Laid-Open Nos. 51-70316, 10-306175, 57-78431, 54-157159 and 55-13765.

The addition amount of the stabilizer in the present invention is preferably from 0.005 to 0.5% by weight, more preferably from 0.01 to 0.4% by weight, and furthermore preferably from 0.05 to 0.3% by weight, in relation to the cellulose acylate. When the addition amount is less than 0.005% by weight, unpreferably the effects of inhibiting degradation and suppressing coloration in the melt film-forming are insufficient. On the other hand, when the addition amount exceeds 0.5% by weight, unpreferably the stabilizer bleeds from the surface of the cellulose acylate film formed by melt film-forming.

Degradation inhibitors and antioxidants are also preferably added. Synergetic effects of inhibiting degradation and oxidation are displayed by adding, as degradation inhibitors or antioxidants, phenolic compounds, thioether compounds, phosphorus compounds and the like. Further, examples of preferably usable stabilizers may include the materials described in detail in Hatsumei Kyokai Kokai Giho (Ko-Gi No. 2001-1745; published date: Mar. 15, 2001; Hatsumei Kyokai) pp. 17-22.

The cellulose acylate of the present invention is characterized by including ultraviolet protecting agents, and may be added with one or more ultraviolet absorbers. Ultraviolet absorbers for liquid crystal are preferably excellent in absorbing ability for the ultraviolet light of 380 nm or less in wavelength from the viewpoint of inhibiting degradation of liquid crystal, and low in absorbing ability for the visible light of 400 nm or more in wavelength from the view point of liquid crystal display quality. Examples of such ultraviolet absorbers may include oxybenzophenone compounds, benzotriazole compounds, salicylic acid ester compounds, benzophenone compounds, cyanoacrylate compounds and nickel complex compounds. Particularly preferred ultraviolet absorbers are benzotriazole compounds and benzophenone compounds. Among these, benzotriazole compounds are preferable because of being low in undesirable coloration for the cellulose acylate.

Examples of preferable ultraviolet protecting agents may include: 2,6-di-tert-butyl-p-cresol, pentaerythrityl-tetrakis-[3-(3,5-di-tert-butyl-4-hydroxyphenyl)propionate], triethyleneglycol-bis[3-(3-tert-butyl-5-methyl-4-hydroxyphenyl)

propionate], 1,6-hexanediol-bis-[3-(3,5-di-tert-butyl-4-hydroxyphenyl)propionate], 2,4-bis-(n-octylthio)-6-(4-hydroxy-3,5-di-tert-butylanilino)-1,3,5-triazine, 2,2-thiodiethylenebis[3-(3,5-di-tert-butyl-4-hydroxyphenyl) propionate], octadecyl-3-(3,5-di-tert-butyl-4-hydroxyphenyl)propionate, N,N'-hexamethylenebis(3,5-di-tert-butyl-4-hydroxy-hydrocinnamide), 1,3,5-trimethyl-2,4,6-tris(3,5-di-tert-butyl-4-hydroxybenzyl)benzene, and tris-(3,5-di-tert-butyl-4-hydroxybenzyl)-isocyanurate.

Further examples of preferable ultraviolet protecting agents may include: 2-(2'-hydroxy-5'-methylphenyl)benzotriazole, 2-(2'-hydroxy-3',5'-di-tert-butylphenyl)benzotriazole, 2-(2'-hydroxy-3'-tert-butyl-5'-methylphenyl)benzotriazole, 2-(2'-hydroxy-3',5'-di-tert-butylphenyl)-5-chlorobenzotriazole, 2-(2'-hydroxy-3'-(3",4",5",6"-tetrahydrophthalimidemethyl)-5'-methylphenyl) benzotriazole, 2,2-methylenebis(4-(1,1,3,3-tetramethylbutyl)-6-(2H-benzotriazol-2-yl)phenol, 2-(2'-hydroxy-3'-tert-butyl-5'-methylphenyl)-5-chlorobenzotriazole, 2-(2H-benzotriazol-2-yl)-6-(straight chain and branched dodecyl)-4-methylphenol, and a mixture composed of octyl-3-[3-tert-butyl-4-hydroxy-5-(chloro-2H-benzotriazol-2-yl)phenyl]propionate and 2-ethylhexyl-3-[3-tert-butyl-4-hydroxy-5-(5-chloro-2H-benzotriazol-2-yl)phenyl]propionate. Additionally, examples of preferably usable ultraviolet absorbers may also include polymer ultraviolet absorbers and polymer-type ultraviolet absorbers described in Japanese Patent Laid-Open No. 6-148430.

Also preferable are 2,6-di-tert-butyl-p-cresol, pentaerythrityl-tetrakis-[3-(3,5-di-tert-butyl-4-hydroxyphenyl)propionate], and triethyleneglycol-bis[3-(3-tert-butyl-5-methyl-4-hydroxyphenyl)propionate]. Hydrazine metal deactivators such as N,N'-bis[3-(3,5-di-tert-butyl-4-hydroxyphenyl)propionyl]hydrazine and phosphorus-containing processing stabilizers such as tris(2,4-di-tert-butylphenyl)phosphite may also be used in combination. The addition amounts of these compounds are, in terms of mass ratio, preferably from 1 ppm to 3.0% and more preferably from 10 ppm to 2% in relation to the cellulose acylate.

For the above described ultraviolet absorbers, the following usable products are commercially available: benzotriazole ultraviolet absorbers such as Tinuvin P, Tinuvin 234, Tinuvin 320, Tibuvin 326, Tinuvin 327 and Tinuvin 328 (Ciba Specialty Chemicals), and Sumisoap 340 (Sumitomo Chemical); benzophenone ultraviolet absorbers such as Seasoap 100, Seasoap 101, Seasoap 101S, Seasoap 102 and Seasoap 103 (Sipro Kasei), Adekas Type LA-51 (Asahi Denka), Chemisoap 111 (Chemipro Kasei) and Uvinul D-49 (BASF); oxalic acid anilide ultraviolet absorbers such as Tinuvin 312 and Tinuvin 315 (Ciba Specialty Chemicals); salicylic acid ultraviolet absorbers such as Seasoap 201 and Seasoap 202 (Sipro Kasei); and cyanoacrylate ultraviolet absorbers such as Seasoap 501 (Sipro Kasei) and Uvinul N-539 (BASF).

Further, there may be added various additives (for example, optical anisotropy controlling agents, fine particulate materials, infrared absorbers, surfactants, and odor trapping agents (amines and the like)). Examples of the usable infrared absorbers may include the infrared absorbing dyes described in Japanese Patent Laid-Open No. 2001-194522, each of these infrared absorbers being contained preferably in a content of 0.001 to 5% by mass in relation to the cellulose acylate. Fine particulate materials made of metal oxides or cross-linked polymers can be used; such materials of 5 to 3000 nm in average particle size are preferably used and are preferably contained in a content of 0.001 to 5% by mass in relation to cellulose acylate. Examples of the usable optical anisotropy controlling agents may include those described in Japanese Patent Laid-Open Nos. 2003-66230 and 2002-49128; such an agent is preferably contained in a content of 0.1 to 15% by mass in relation to the cellulose acylate.

(Melt Film Forming)

(1) Drying

The cellulose acylate resin may be used as it is in a state of a powder, but a pelletized cellulose acylate resin is more preferably used for the purpose of suppressing the thickness fluctuation of the formed film.

The cellulose acylate resin is made to have a moisture content of 1% or less, more preferably 0.5% or less and furthermore preferably 0.1% or less, and then placed in the hopper equipped with the extruder, when the temperature of the hopper is set preferably at Tg−50° C. or higher and Tg+30° C. or lower, more preferably at Tg−40° C. or higher and Tg+10° C. or lower, and furthermore preferably at Tg−30° C. or higher and Tg or lower. The reabsorption of the moisture in the hopper is thereby suppressed to make it possible to easily attain the efficiency of the above described drying. Further, it is also more preferable to blow dehumidified air or an inert gas (for example, nitrogen) into the hopper.

(2) Kneading and Extruding

The dried cellulose acylate resin is kneaded to be melted preferably at 190° C. or higher and 240° C. or lower, more preferably at 195° C. or higher and 235° C. or lower, and furthermore preferably 200° C. or higher and 230° C. or lower. In this case, melting may be carried out at a constant melting temperature, or at several separately controlled temperatures. The kneading time is preferably 2 minutes or more and 60 minutes or less, more preferably 3 minutes or more and 40 minutes or less, and furthermore preferably 4 minutes or more and 30 minutes or less. Additionally, the kneading and melting are carried out preferably in a flow of an inert gas (nitrogen or the like) introduced into the extruder, or preferably under vacuum evacuation with an extruder equipped with a vent.

(3) Cast

The molten cellulose acylate resin is made to pass through gear pump to dampen the pulsation due to the extruder 11, then subjected to filtration with a metal mesh filter or the like, and is extruded in the form of a sheet from a T-shaped die 12, disposed at a position downstream of the filter, onto the cooling drum 14. The extrusion may be carried out in a single layer mode, or may be carried out in a multilayer mode with a multi-manifold die or a feed block die. In the extrusion, by controlling the interval between the lips of the die 12, the transverse thickness nonuniformity can be controlled.

Thereafter, the molten cellulose acylate is extruded onto the cooling drum 14, wherein the touch roll method or the like is used. The temperature of the cooling drum 14 is preferably 60° C. or higher and 160° C. or lower, more preferably 70° C. or higher and 150° C. or lower, and furthermore preferably 80° C. or higher and 140° C. or lower. Then, the sheet is peeled from the cooling drum 14, treated with niprolls 22 and 24 and with a tenter, and wound up. The winding-up speed is preferably 10 m/min or more and 100 m/min or less, more preferably 15 m/min or more and 80 m/min or less, and furthermore preferably 20 m/min or more and 70 m/min less.

The width of the formed film is preferably 1 m or more and 5 m or less, more preferably 1.2 m or more and 4 m or less, and furthermore preferably 1.3 m or more and 3 m or less. The thickness of the unstretched cellulose acylate film thus obtained is preferably 30 μm or more and 400 μm or less, more preferably 40 μm or more and 300 μm or less, and furthermore preferably 50 μm or more and 200 μm or less.

The cellulose acylate film 12 thus obtained is trimmed on both edges, and preferably once wound up by a winder 40.

The portion removed by trimming is pulverized, and if needed, granulated, depolymerized/repolymerized, and thereafter may be recycled as a raw materials for the same type of cellulose acylate films or different types of cellulose acylate films. It is also preferable from the viewpoint of preventing flaws that before winding up, at least one side of the cellulose acylate film is covered with a lami-film.

The glass transition temperature (Tg) of the cellulose acylate film thus obtained is preferably 70° C. or higher and 180° C. or lower, more preferably 80° C. or higher and 160° C. or lower, and furthermore preferably 90° C. or higher and 150° C. or lower.

(Processing of Cellulose Acylate Films)

The cellulose acylate film formed by means of the above described process is stretched uniaxially or biaxially by means of the above described process to produce a stretched cellulose acylate film. This film may be used alone, in combination with sheet polarizer, with a liquid crystal layer or a layer controlled in refractive index (low reflection layer) disposed thereon, or with a hard coat layer disposed thereon. These uses are achieved by the following process.

(1) Surface Treatment

Surface treatment of the cellulose acylate film improves the adhesion thereof to various functional layers (for example, a primer layer or a back layer). For that purpose, for example, there can be used the glow discharge treatment, the ultraviolet irradiation treatment, the corona treatment, the flame treatment or the acid or alkali treatment. The glow discharge treatment as referred to herein may use a low temperature plasma to occur under a low pressure gas of $10^{-3}$ to $10^{-20}$ Torr, or is preferably a plasma treatment under atmospheric pressure. The plasma excitation gas means a gas undergoing plasma excitation under such conditions as above described; examples of such gas may include argon, helium, neon, krypton, xenon, nitrogen, carbon dioxide, chlorofluorocarbons such as tetrafluoromethane and mixtures thereof. These gases are described in detail in Hatsumei Kyokai Kokai Giho (Ko-Gi No. 2001-1745; published date: Mar. 15, 2001; Hatsumei Kyokai) pp. 30-32. In a plasma treatment under atmospheric pressure, recently attracting attention, there is used an irradiation energy of 20 to 500 kGy under from 10 to 1000 keV, and more preferably from 20 to 300 kGy under from 30 to 500 keV.

Particularly preferred among these treatments is the alkali saponification treatment.

Alkali saponification may be carried out by immersing the film in a saponifying solution (immersing method) or by coating the film with a saponifying solution. The saponification by immersion can be achieved by allowing the film to pass through a bath, in which an aqueous solution of NaOH or KOH with pH of 10 to 14 has been heated to 20° C. to 80° C., over 0.1 to 10 minutes, neutralizing the same, water-washing the neutralized film, followed by drying.

The saponification by coating can be carried out using a coating method such as dip coating, curtain coating, extrusion coating, bar coating or E-coating. A solvent for alkali-saponification solution is preferably selected from solvents that allow the saponifying solution to have excellent wetting characteristics when the solution is applied to a transparent substrate; and allow the surface of a transparent substrate to be kept in a good state without causing irregularities on the surface. Specifically, alcohol solvents are preferable, and isopropyl alcohol is particularly preferable. An aqueous solution of surfactant can also be used as a solvent. As an alkali for the alkali-saponification coating solution, an alkali soluble in the above described solvent is preferable, and KOH or NaOH is more preferable. The pH of the alkali-saponification coating solution is preferably 10 or more and more preferably 12 or more. Preferably, the alkali saponification reaction is carried at room temperature for 1 second or longer and 5 minutes or shorter, more preferably for 5 seconds or longer and 5 minutes or shorter, and particularly preferably for 20 seconds or longer and 3 minutes or shorter. It is preferable to wash the saponifying solution-coated surface with water or an acid and wash the surface with water again after the alkali saponification reaction. The coating-type saponification and the removal of orientation layer described later can be performed continuously, whereby the number of the manufacturing steps can be decreased. The details of these saponifying processes are described in, for example, Japanese Patent Application Laid-Open No. 2002-82226 and WO 02/46809.

To improve the adhesion of the unstretched or stretched cellulose acylate film to each functional layer, it is preferable to provide an undercoat layer on the cellulose acylate film. The undercoat layer may be provided after carrying out the above described surface treatment or without the surface treatment. The details of the undercoat layers are described in Journal of Technical Disclosure (Laid-Open No. 2001-1745, issued on Mar. 15, 2001, by Japan Institute of Invention and Innovation), 32.

These surface-treatment step and under-coat step can be incorporated into the final part of the film forming step, or they can be performed independently, or they can be performed in the functional-layer providing process described later.

(2) Providing Functional Layer

Preferably, the stretched and unstretched cellulose acylate films of the present invention are combined with any one of the functional layers described in detail in Journal of Technical Disclosure (Laid-Open No. 2001-1745, issued on Mar. 15, 2001, by Japan Institute of Invention and Innovation), 32-45. Particularly preferable is providing a polarizing layer (polarizer), optical compensation layer (optical compensation film), antireflection layer (antireflection film) or hard coat layer.

(i) Providing Polarizing Layer (Preparation of Polarizer)

(i-1) Materials Used for Polarizing Layer

At the present time, generally, commercially available polarizing layers are prepared by immersing stretched polymer in a solution of iodine or a dichroic dye in a bath so that the iodine or dichroic dye penetrates into the binder. Coating-type of polarizing films, represented by those manufactured by Optiva Inc., are also available as a polarizing film. Iodine or a dichroic dye in the polarizing film develops polarizing properties when its molecules are oriented in a binder. Examples of dichroic dyes applicable include: azo dye, stilbene dye, pyrazolone dye, triphenylmethane dye, quinoline dye, oxazine dye, thiazine dye and anthraquinone dye. The dichroic dye used is preferably water-soluble. The dichroic dye used preferably has a hydrophilic substitute (e.g. sulfo, amino, or hydroxyl). Example of such dichroic dyes includes: compounds described in Journal of Technical Disclosure, Laid-Open No. 2001-1745, 58, (issued on Mar. 15, 2001, by Japan Institute of Invention and Innovation).

Any polymer which is crosslinkable in itself or which is crosslinkable in the presence of a crosslinking agent can be used as a binder for polarizing films. And more than one combination thereof can also be used as a binder. Examples of binders applicable include: compounds described in Japanese Patent Application Laid-Open No. 8-338913, column [0022], such as methacrylate copolymers, styrene copolymers, polyolefin, polyvinyl alcohol and denatured polyvinyl alcohol, poly(N-methylolacrylamide), polyester, polyimide, vinyl acetate copolymer, carboxymethylcellulose, and polycarbonate. Silane coupling agents can also be used as a polymer. Preferable are water-soluble polymers (e.g. poly(N-methylolacrylamide), carboxymethylcellulose, gelatin, polyvinyl alcohol and denatured polyvinyl alcohol), more preferable are gelatin, polyvinyl alcohol and denatured polyvinyl alcohol, and most preferable are polyvinyl alcohol and denatured polyvinyl alcohol. Use of two kinds of polyvinyl alcohol or denatured polyvinyl alcohol having different polymerization degrees in combination is particularly preferable. The saponification degree of polyvinyl alcohol is preferably 70 to 100% and more preferably 80 to 100%. The polymerization degree of polyvinyl alcohol is preferably 100 to 5000. Details of denatured polyvinyl alcohol are described in Japanese Patent Application Laid-Open Nos. 8-338913, 9-152509 and 9-316127. For polyvinyl alcohol and denatured polyvinyl alcohol, two or more kinds may be used in combination.

Preferably, the minimum of the binder thickness is 10 m. For the maximum of the binder thickness, from the viewpoint of light leakage of liquid crystal displays, preferably the binder has the smallest possible thickness. The thickness of the binder is preferably equal to or smaller than that of currently commercially available polarizer (about 30 μm), more preferably 25 μm or smaller, and much more preferably 20 μm or smaller.

The binder for polarizing films may be crosslinked. Polymer or monomer that has a crosslinkable functional group may be mixed into the binder. Or a crosslinkable functional group may be provided to the binder polymer itself. Crosslinking reaction is allowed to progress by means of light, heat or pH changes, and a binder having a crosslinked structure can be formed by crosslinking reaction. Examples of crosslinking agents applicable are described in U.S. Pat. (Reissued) No. 23297. Boron compounds (e.g. boric acid and borax) may also be used as a crosslinking agent. The amount of the crosslinking agent added to the binder is preferably 0.1 to 20% by mass of the binder. This allows polarizing devices to have good orientation characteristics and polarizing films to have good damp heat resistance.

The amount of the unreacted crosslinking agent after completion of the crosslinking reaction is preferably 1.0% by mass or less and more preferably 0.5% by mass or less. Restraining the unreacted crosslinking agent to such an amount improves the weatherability of the binder.

(i-2) Stretching of Polarizing Film

Preferably, a polarizing film is dyed with iodine or a dichroic dye after undergoing stretching (stretching process) or rubbing (rubbing process).

In the stretching process, preferably the stretching magnification is 2.5 to 30.0 and more preferably 3.0 to 10.0. Stretching can be dry stretching, which is performed in the air. Stretching can also be wet stretching, which is performed while immersing a film in water. The stretching magnification in the dry stretching is preferably 2.5 to 5.0, while the stretching magnification in the wet stretching is preferably 3.0 to 10.0. Stretching may be performed parallel to the MD direction (parallel stretching) or in an oblique (oblique stretching). These stretching operations may be performed at one time or in several installments. Stretching can be performed more uniformly even in high-ratio stretching if it is performed in several installments.

● Parallel Stretching Method

Prior to stretching, a PVA film is swelled. The degree of swelling is 1.2 to 2.0 (ratio of mass before swelling to mass after swelling). After this swelling operation, the PVA film is stretched in a water-based solvent bath or in a dye bath in which a dichroic substance is dissolved at a bath temperature of 15 to 50° C., preferably 17 to 40° C. while continuously conveying the film via a guide roll etc. Stretching can be accomplished in such a manner as to grip the PVA film with 2 pairs of nip rolls and control the conveying speed of nip rolls so that the conveying speed of the latter pair of nip rolls is higher than that of the former pair of nip rolls. The stretching magnification is based on the length of PVA film after stretching/the length of the same in the initial state ratio (hereinafter the same), and from the viewpoint of the above described advantages, the stretching magnification is preferably 1.2 to 3.5 and more preferably 1.5 to 3.0. After this stretching operation, the film is dried at 50° C. to 90° C. to obtain a polarizing film.

● Oblique Stretching Method

Oblique stretching can be performed by the method described in Japanese Patent Application Laid-Open No. 2002-86554 in which a tenter that projects on a tilt is used. This stretching is performed in the air; therefore, it is necessary to allow a film to contain water so that the film is easy to stretch. Preferably, the water content in the film is 5% or higher and 100% or lower, the stretching temperature is 40° C. or higher and 90° C. or lower, and the humidity during the stretching operation is preferably 50% rh or higher and 100% rh or lower.

In stretching, the temperature is preferably 40° C. or higher and 90° C. or lower and more preferably 50° C. or higher and 80° C. or lower, the humidity is preferably 50% rh or more and 100% rh or less, more preferably 70% rh or more and 100% rh or less, and furthermore preferably 80% rh or more and 100% rh or less. The longitudinal traveling speed is preferably 1 m/min or more and more preferably 3 m/min or more. Subsequently to stretching, drying is carried out preferably for 0.5 minute or more and 10 minutes or less and more preferably for 1 minute or more and 5 minutes of less, preferably at 50° C. or higher and 100° C. or lower and more preferably at 60° C. or higher and 90° C. or lower.

The absorbing axis of the polarizing film thus obtained is preferably 10 degrees to 80 degrees, more preferably 30 degrees to 60 degrees, and much more preferably substantially 45 degrees (40 degrees to 50 degrees).

(i-3) Laminating

The cellulose acylate film having undergone the above described saponification and the polarizing layer prepared by stretching are laminated together to yield a sheet polarizer. The laminating is preferably carried out in such a way that the angle between the flow casting axis direction of the cellulose acylate film and the stretching axis direction of the sheet polarizer is 45 degrees.

Any adhesive can be used for the lamination. Examples of adhesives applicable include: PVA resins (including denatured PVA such as acetoacetyl, sulfonic, carboxyl or oxyalkylen group) and aqueous solutions of boron compounds. Of these adhesives, PVA resins are preferable. The thickness of the adhesive layer is preferably 0.01 to 10 μm and particularly preferably 0.05 to 5 μm, on a dried layer basis.

Preferably, the sheets of polarizer thus obtained have a high light transmittance and a high degree of polarization. The light transmittance of the polarizer is preferably in the range of 30 to 50% at a wavelength of 550 nm, more preferably in the range of 35 to 50%, and most preferably in the range of 40 to 50%. The degree of polarization is preferably in the range of 90 to 100% at a wavelength of 550 nm, more preferably in the range of 95 to 100%, and most preferably in the range of 99 to 100%.

The sheets of polarizer thus obtained can be laminated with a λ/4 plate to create circularly polarized light. In this case, they are laminated so that the angle between the slow axis of the λ/4 plate and the absorbing axis of the polarizer is 45 degrees. Any λ/4 plate can be used to create circularly polarized light; however, preferably one having such wavelength-dependency that retardation is decreased with decrease in wavelength is used. More preferably, a polarizing film having an absorbing axis which tilts 20 degrees to 70 degrees in the longitudinal direction and a λ/4 plate that includes an optically anisotropic layer made up of a liquid crystalline compound are used.

(ii) Providing Optical Compensation Layer (Preparation of Optical Compensation Film)

An optically anisotropic layer is used for compensating the liquid crystalline compound in a liquid crystal cell in black display by a liquid crystal display. It is prepared by forming an orientation film on each of the stretched and unstretched cellulose acylate films and providing an optically anisotropic layer on the orientation film.

(ii-1) [Orientation Film]

An orientation film is provided on the above described stretched and unstretched cellulose acylate films which have undergone surface treatment. This film has the function of specifying the orientation direction of liquid crystalline molecules. However, this film is not necessarily indispensable constituent of the present invention. This is because a liquid crystalline compound plays the role of the orientation film, as long as the aligned state of the liquid crystalline compound is fixed after it undergoes orientation treatment. In other words, the sheets of polarizer of the present invention can also be prepared by transferring only the optically anisotropic layer on the orientation film, where the orientation state is fixed, on the polarizer.

An orientation film can be provided using a technique such as rubbing of an organic compound (preferably polymer), oblique deposition of an inorganic compound, formation of a micro-groove-including layer, or built-up of an organic compound (e.g. ω-tricosanic acid, dioctadecyl methyl ammonium chloride, methyl stearate) by Langmur-Blodgett technique (LB membrane). Orientation films in which orientation function is produced by the application of electric field, electromagnetic field or light irradiation are also known.

Preferably, the orientation film is formed by rubbing of polymer. As a general rule, the polymer used for the orientation film has a molecular structure having the function of aligning liquid crystalline molecules.

In the present invention, preferably the orientation film has not only the function of aligning liquid crystalline molecules, but also the function of combining a side chain having a crosslinkable functional group (e.g. double bond) with the main chain or the function of introducing a crosslinkable functional group having the function of aligning liquid crystalline molecules into a side chain.

Either polymer which is crosslinkable in itself or polymer which is crosslinkable in the presence of a crosslinking agent can be used for the orientation film. And a plurality of the combinations thereof can also be used. Examples of such polymer include: those described in Japanese Patent Application Laid-Open No. 8-338913, column [0022], such as methacrylate copolymers, styrene copolymers, polyolefin, polyvinyl alcohol and denatured polyvinyl alcohol, poly(N-methylolacrylamide), polyester, polyimide, vinyl acetate copolymer, carboxymethylcellulose, and polycarbonate. Silane coupling agents can also be used as a polymer. Preferable are water-soluble polymers (e.g. poly(N-methylolacrylamide), carboxymethylcellulose, gelatin, polyvinyl alcohol and denatured polyvinyl alcohol), more preferable are gelatin, polyvinyl alcohol and denatured polyvinyl alcohol, and most preferable are polyvinyl alcohol and denatured polyvinyl alcohol. Use of two kinds of polyvinyl alcohol or denatured polyvinyl alcohol having different polymerization degrees in combination is particularly preferable. The saponification degree of polyvinyl alcohol is preferably 70 to 100% and more preferably 80 to 100%. The polymerization degree of polyvinyl alcohol is preferably 100 to 5000.

Side chains having the function of aligning liquid crystal molecules generally have a hydrophobic group as a functional group. The kind of the functional group is determined depending on the kind of liquid crystalline molecules and the aligned state required. For example, a denatured group of denatured polyvinyl alcohol can be introduced by copolymerization denaturation, chain transfer denaturation or block polymerization denaturation. Examples of denatured groups include: hydrophilic groups (e.g. carboxylic, sulfonic, phosphonic, amino, ammonium, amide and thiol groups); hydrocarbon groups with 10 to 100 carbon atoms; fluorine-substituted hydrocarbon groups; thioether groups; polymerizable groups (e.g. unsaturated polymerizable groups, epoxy group, azirinyl group); and alkoxysilyl groups (e.g. trialkoxy, dialkoxy, monoalkoxy). Specific examples of these denatured polyvinyl alcohol compounds include: those described in Japanese Patent Application Laid-Open No. 2000-155216, columns [0022] to [0145], Japanese Patent Application Laid-Open No. 2002-62426, columns [0018] to [0022].

Combining a side chain having a crosslinkable functional group with the main chain of the polymer of an orientation film or introducing a crosslinkable functional group into a side chain having the function of aligning liquid crystal molecules makes it possible to copolymerize the polymer of the orientation film and the polyfunctional monomer contained in the optically anisotropic layer. As a result, not only the molecules of the polyfunctional monomer, but also the molecules of the polymer of the orientation film and those of the polyfunctional monomer and the polymer of the orientation film are covalently firmly bonded together. Thus, introduction of a crosslinkable functional group into the polymer of an orientation film enables remarkable improvement in the strength of optical compensation films.

The crosslinkable functional group of the polymer of the orientation film preferably has a polymerizable group, like the polyfunctional monomer. Specific examples of such crosslinkable functional groups include: those described in Japanese Patent Application Laid-Open No. 2000-155216, columns [0080] to [0100]. The polymer of the orientation film can be crosslinked using a crosslinking agent, besides the above described crosslinkable functional groups.

Examples of crosslinking agents applicable include: aldehyde; N-methylol compounds; dioxane derivatives; compounds that function by the activation of their carboxyl group; activated vinyl compounds; activated halogen compounds; isoxazol; and dialdehyde starch. Two or more kinds of crosslinking agents may be used in combination. Specific examples of such crosslinking agents include: compounds described in Japanese Patent Application Laid-Open No. 2002-62426, columns [0023] to [0024]. Aldehyde, which is highly reactive, particularly glutaraldehyde is preferably used as a crosslinking agent.

The amount of the crosslinking agent added is preferably 0.1 to 20% by mass of the polymer and more preferably 0.5 to 15% by mass. The amount of the unreacted crosslinking agent remaining in the orientation film is preferably 1.0% by mass or less and more preferably 0.5% by mass or less. Controlling the amount of the crosslinking agent and unreacted crosslinking agent in the above described manner makes it possible to obtain a sufficiently durable orientation film, in which reticulation does not occur even after it is used in a liquid crystal display for a long time or it is left in an atmosphere of high temperature and high humidity for a long time.

Basically, an orientation film can be formed by: coating the above described polymer, as a material for forming an orientation film, on a transparent substrate containing a crosslinking agent; heat drying (crosslinking) the polymer; and rubbing the same. The crosslinking reaction may be carried out at any time after the polymer is applied to the transparent substrate, as described above. When a water-soluble polymer, such as polyvinyl alcohol, is used as the material for forming an orientation film, the coating solution is preferably a mixed solvent of an organic solvent having an anti-foaming function (e.g. methanol) and water. The mixing ratio is preferably such that water:methanol=0:100 to 99:1 and more preferably 0:100 to 91:9. The use of such a mixed solvent suppresses the generation of foam, thereby significantly decreasing defects not only in the orientation film, but also on the surface of the optically anisotropic layer.

As a coating method for coating an orientation film, spin coating, dip coating, curtain coating, extrusion coating, rod coating or roll coating is preferably used. Particularly preferably used is rod coating. The thickness of the film after drying is preferably 0.1 to 10 μm. The heat drying can be carried out at 20° C. to 110° C. To achieve sufficient crosslinking, preferably the heat drying is carried out at 60° C. to 100° C. and particularly preferably at 80° C. to 100° C. The drying time can be 1 minute to 36 hours, but preferably it is 1 minute to 30 minutes. Preferably, the pH of the coating solution is set to a value optimal to the crosslinking agent used. When glutaraldehyde is used, the pH is 4.5 to 5.5 and particularly preferably 5.0.

The orientation film is provided on the stretched and unstretched cellulose acylate films or on the above described undercoat layer. The orientation film can be obtained by crosslinking the polymer layer and providing rubbing treatment on the surface of the polymer layer, as described above.

The above described rubbing treatment can be carried out using a treatment method widely used in the treatment of liquid crystal orientation in LCD. Specifically, orientation can be obtained by rubbing the surface of the orientation film in a fixed direction with paper, gauze, felt, rubber or nylon, polyester fiber and the like. Generally the treatment is carried out by repeating rubbing a several times using a cloth in which fibers of uniform length and diameter have been uniformly transplanted.

In the rubbing treatment industrially carried out, rubbing is performed by bringing a rotating rubbing roll into contact with a running film including a polarizing layer. The circularity, cylindricity and deviation (eccentricity) of the rubbing roll are preferably 30 μm or less respectively. The wrap angle of the film wrapping around the rubbing roll is preferably 0.1 to 90°. However, as described in Japanese Patent Application Laid-Open No. 8-160430, if the film is wrapped around the rubbing roll at 360° or more, stable rubbing treatment is ensured. The conveying speed of the film is preferably 1 to 100 m/min. Preferably, the rubbing angle is properly selected from the range of 0 to 60°. When the orientation film is used in liquid crystal displays, the rubbing angle is preferably 40° to 50° and particularly preferably 45°.

The thickness of the orientation film thus obtained is preferably in the range of 0.1 to 10 μm.

Then, liquid crystalline molecules of the optically anisotropic layer are aligned on the orientation film. After that, if necessary, the polymer of the orientation film and the polyfunctional monomer contained in the optically anisotropic layer are reacted, or the polymer of the orientation film is crosslinked using a crosslinking agent.

The liquid crystalline molecules used for the optically anisotropic layer include: rod-shaped liquid crystalline molecules and discotic liquid crystalline molecules. The rod-shaped liquid crystalline molecules and discotic liquid crystalline molecules may be either high-molecular-weight liquid crystalline molecules or low-molecular-weight liquid crystalline molecules, and they include low-molecule liquid crystalline molecules which have undergone crosslinking and do not show liquid crystallinity any more.

(ii-2) [Rod-Shaped Liquid Crystalline Molecules]

Examples of rod-shaped liquid crystalline molecules preferably used include: azomethines, azoxys, cyanobiphenyls, cyanophenyl esters, benzoate esters, cyc lohexane carboxylic acid phenyl esters, cyanophenyl cyclohexanes, cyano-substituted phenyl pyrimidines, alkoxy-substituted phenyl pyrimidines, phenyl dioxanes, tolans, and alkenyl cyclohexyl benzonitriles.

Rod-shaped liquid crystalline molecules also include metal complexes. Liquid crystal polymer that includes rod-shaped liquid crystalline molecules in its repeating unit can also be used as rod-shaped liquid crystalline molecules. In other words, rod-shaped liquid crystalline molecules may be bonded to (liquid crystal) polymer.

Rod-shaped liquid crystalline molecules are described in Kikan Kagaku Sosetsu (Survey of Chemistry, Quarterly), Vol. 22, Chemistry of Liquid Crystal (1994), edited by The Chemical Society of Japan, Chapters 4, 7 and 11 and in Handbook of Liquid Crystal Devices, edited by 142th Committee of Japan Society for the Promotion of Science, Chapter 3.

The index of birefringence of the rod-shaped liquid crystalline molecules is preferably in the range of 0.001 to 0.7. To allow the aligned state to be fixed, preferably the rod-shaped liquid crystalline molecules have a polymerizable group. As such a polymerizable group, a radically polymerizable unsaturated group or cationically polymerizable group is preferable. Specific examples of such polymerizable groups include: polymerizable groups and polymerizable liquid crystal compounds described in Japanese Patent Application Laid-Open No. 2002-62427, columns [0064] to [0086].

(ii-3) [Discotic Liquid Crystalline Molecules]

Discotic liquid crystalline molecules include: benzene derivatives described in the research report by C. Destrade et al., Mol. Cryst. Vol. 71, 111 (1981); truxene derivatives described in the research report by C. Destrade et al., Mol. Cryst. Vol. 122, 141 (1985) and Physics lett, A, Vol. 78, 82 (1990); cyclohexane derivatives described in the research report by B. Kohne et al., Angew. Chem. Vol. 96, 70 (1984); and azacrown or phenylacetylene macrocycles described in the research report by J. M. Lehn et al., J. Chem. Commun., 1794 (1985) and in the research report by J. Zhang et al., L. Am. Chem. Soc. Vol. 116, 2655 (1994).

Discotic liquid crystalline molecules also include liquid crystalline compounds having a structure in which straight-chain alkyl group, alkoxy group and substituted benzoyloxy group are substituted radially as the side chains of the mother nucleus at the center of the molecules. Preferably, the compounds are such that their molecules or groups of molecules have rotational symmetry and they can provide an optically anisotropic layer with a fixed orientation. In the ultimate state of the optically anisotropic layer formed of discotic liquid crystalline molecules, the compounds contained in the optically anisotropic layer are not necessarily discotic liquid crystalline molecules. The ultimate state of the optically anisotropic layer also contain compounds such that they are originally of low-molecular-weight discotic liquid crystalline molecules having a group reactive with heat or light, but undergo polymerization or crosslinking by heat or light, thereby becoming higher-molecular-weight molecules and losing their liquid crystallinity. Examples of preferred discotic liquid crystalline molecules are described in Japanese Patent Application Laid-Open No. 8-50206. And the details of the polymerization of discotic liquid crystalline molecules are described in Japanese Patent Application Laid-Open No. 8-27284.

To fix the discotic liquid crystalline molecules by polymerization, it is necessary to bond a polymerizable group, as a substitute, to the discotic core of the discotic liquid crystalline molecules. Compounds in which their discotic core and a polymerizable group are bonded to each other via a linking group are preferably used. With such compounds, the aligned state is maintained during the polymerization reaction. Examples of such compounds include: those described in Japanese Patent Application Laid-Open No. 2000-155216, columns [0151] to [0168].

In hybrid orientation, the angle between the long axis (disc plane) of the discotic liquid crystalline molecules and the plane of the polarizing film increases or decreases, across the depth of the optically anisotropic layer, with increase in the distance from the plane of the polarizing film. Preferably, the angle decreases with increase in the distance. The possible changes in angle include: continuous increase, continuous decrease, intermittent increase, intermittent decrease, change including both continuous increase and continuous decrease, and intermittent change including increase and decrease. The intermittent changes include the area midway across the thickness where the tilt angle does not change. Even if the change includes the area where the angle does not change, it does not matter as long as the angle increases or decreased as a whole. Preferably, the angle changes continuously.

Generally, the average direction of the long axis of the discotic liquid crystalline molecules on the polarizing film side can be adjusted by selecting the type of discotic liquid crystalline molecules or the material for the orientation film, or by selecting the method of rubbing treatment. On the other hand, generally the direction of the long axis (disc plane) of the discotic liquid crystalline molecules on the surface side (on the air side) can be adjusted by selecting the type of discotic liquid crystalline molecules or the type of the additives used together with the discotic liquid crystalline molecules. Examples of additives used with the discotic liquid crystalline molecules include: plasticizer, surfactant, polymerizable monomer, and polymer. The degree of the change in orientation in the long axis direction can also be adjusted by selecting the type of the liquid crystalline molecules and that of additives, like the above described cases.

(ii-4) [Other Compositions of Optically Anisotropic Layer]

Use of plasticizer, surfactant, polymerizable monomer, etc. together with the above described liquid crystalline molecules makes it possible to improve the uniformity of the coating film, the strength of the film and the orientation of liquid crystalline molecules. Preferably, such additives are compatible with the liquid crystalline molecules, and they can change the tilt angle of the liquid crystalline molecules or do not inhibit the orientation of the liquid crystalline molecules.

Examples of polymerizable monomers applicable include radically polymerizable or cationically polymerizable compounds. Preferable are radically polymerizable polyfunctional monomers which are copolymerizable with the above described polymerizable-group containing liquid crystalline compounds. Specific examples are those described in Japanese Patent Application Laid-Open No. 2002-296423, columns [0018] to [0020]. The amount of the above described compounds added is generally in the range of 1 to 50% by mass of the discotic liquid crystalline molecules and preferably in the range of 5 to 30% by mass.

Examples of surfactants include traditionally known compounds; however, fluorine compounds are particularly preferable. Specific examples of fluorine compounds include compounds described in Japanese Patent Application Laid-Open No. 2001-330725, columns [0028] to [0056].

Preferably, polymers used together with the discotic liquid crystalline molecules can change the tilt angle of the discotic liquid crystalline molecules.

Examples of polymers applicable include cellulose esters. Examples of preferred cellulose esters include those described in Japanese Patent Application Laid-Open No. 2000-155216, columns [0178]. Not to inhibit the orientation of the liquid crystalline molecules, the amount of the above described polymers added is preferably in the range of 0.1 to 10% by mass of the liquid crystalline molecules and more preferably in the range of 0.1 to 8% by mass.

The discotic nematic liquid crystal phase-solid phase transition temperature of the discotic liquid crystalline molecules is preferably 70 to 300° C. and more preferably 70 to 170° C.

(ii-5) [Formation of Optically Anisotropic Layer]

An optically anisotropic layer can be formed by coating the surface of the orientation film with a coating fluid that contains liquid crystalline molecules and, if necessary, polymerization initiator or any other ingredients described later.

As a solvent used for preparing the coating fluid, an organic solvent is preferably used. Examples of organic solvents applicable include: amides (e.g. N,N-dimethylformamide); sulfoxides (e.g. dimethylsulfoxide); heterocycle compounds (e.g. pyridine); hydrocarbons (e.g. benzene, hexane); alkyl halides (e.g. chloroform, dichloromethane, tetrachloroethane); esters (e.g. methyl acetate, butyl acetate); ketones (e.g. acetone, methyl ethyl ketone); and ethers (e.g. tetrahydrofuran, 1,2-dimethoxyethane). Alkyl halides and ketones are preferably used. Two or more kinds of organic solvent can be used in combination.

Such a coating fluid can be applied by a known method (e.g. wire bar coating, extrusion coating, direct gravure coating, reverse gravure coating or die coating method).

The thickness of the optically anisotropic layer is preferably 0.1 to 20 μm, more preferably 0.5 to 15 μm, and most preferably 1 to 10 μm.

(ii-6) [Fixation of Orientation State of Liquid Crystalline Molecules]

The aligned state of the aligned liquid crystalline molecules can be maintained and fixed. Preferably, the fixation is performed by polymerization. Types of polymerization include: heat polymerization using a heat polymerization initiator and photopolymerization using a photopolymerization initiator. For the fixation, photopolymerization is preferably used.

Examples of photopolymerization initiators include: α-carbonyl compounds (described in U.S. Pat. Nos. 2,367,661 and 2,367,670); acyloin ethers (described in U.S. Pat. No. 2,448,828); 1-hydrocarbon-substituted aromatic acyloin compounds (U.S. Pat. No. 2,722,512); multi-nucleus quinone compounds (described in U.S. Pat. Nos. 3,046,127 and 2,951,758); combinations of triarylimidazole dimmer and p-aminophenyl ketone (described in U.S. Pat. No. 3,549,367); acridine and phenazine compounds (described in Japanese Patent Application Laid-Open No. 60-105667 and U.S. Pat. No. 4,239,850); and oxadiazole compounds (described in U.S. Pat. No. 4,212,970).

The amount of the photopolymerization initiators used is preferably in the range of 0.01 to 20% by mass of the solid content of the coating fluid and more preferably in the range of 0.5 to 5% by mass.

Light irradiation for the polymerization of liquid crystalline molecules is preferably performed using ultraviolet light.

Irradiation energy is preferably in the range of 20 mJ/cm2 to 50 J/cm2, more preferably 20 to 5000 mJ/cm2, and much more preferably 100 to 800 mJ/cm2. To accelerate the photopolymerization, light irradiation may be performed under heat.

A protective layer may be provided on the surface of the optically anisotropic layer.

Combining the optical compensation film with a polarizing layer is also preferable. Specifically, an optically anisotropic layer is formed on a polarizing film by coating the surface of the polarizing film with the above described coating fluid for an optically anisotropic layer. As a result, thin polarlizer, in which stress generated with the dimensional change of polarizing film (distorsion×cross-sectional area×modulus of elasticity) is small, can be prepared without using a polymer film between the polarizing film and the optically anisotropic layer. Installing the polarizer according to the present invention in a large-sized liquid crystal display device enables high-quality images to be displayed without causing problems such as light leakage.

Preferably, stretching is performed while keeping the tilt angle of the polarizing layer and the optical compensation layer to the angle between the transmission axis of the two sheets of polarizer laminated on both sides of a liquid crystal cell constituting LCD and the longitudinal or transverse direction of the liquid crystal cell. Generally the tilt angle is 45°. However, in recent years, transmissive-, reflective-, and semi-transmissive-liquid crystal display devices have been developed in which the tilt angle is not always 45°, and thus, it is preferable to adjust the stretching direction arbitrarily to the design of each LCD.

(ii-7) [Liquid Crystal Display Devices]

Liquid crystal modes in which the above described optical compensation film is used will be described.

(TN-Mode Liquid Crystal Display Devices)

TN-mode liquid crystal display devices are most commonly used as a color TFT liquid crystal display device and described in a large number of documents. The aligned state in a TN-mode liquid crystal cell in the black state is such that the rod-shaped liquid crystalline molecules stand in the middle of the cell while the rod-shaped liquid crystalline molecules lie near the substrates of the cell.

(OCB-Mode Liquid Crystal Display Devices)

An OCB-mode liquid crystal cell is a bend orientation mode liquid crystal cell where the rod-shaped liquid crystalline molecules in the upper part of the liquid cell and those in the lower part of the liquid cell are aligned in substantially opposite directions (symmetrically). Liquid crystal displays using a bend orientation mode liquid crystal cell are disclosed in U.S. Pat. Nos. 4,583,825 and 5,410,422. A bend orientation mode liquid crystal cell has a self-compensation function since the rod-shaped liquid crystalline molecules in the upper part of the liquid cell and those in the lower part are symmetrically aligned. Thus, this liquid crystal mode is also referred to as OCB (Optically Compensatory Bend) liquid crystal mode.

Like in the TN-mode cell, the aligned state in an OCB-mode liquid crystal cell in the black state is also such that the rod-shaped liquid crystalline molecules stand in the middle of the cell while the rod-shaped liquid crystalline molecules lie near the substrates of the cell.

(VA-Mode Liquid Crystal Display Devices)

VA-mode liquid crystal cells are characterized in that in the cells, rod-shaped liquid crystalline molecules are aligned substantially vertically when no voltage is applied. The VA-Mode Liquid Crystal Cells Include: (1) a VA-Mode Liquid Crystal Cell in a narrow sense where rod-shaped liquid crystalline molecules are aligned substantially vertically when no voltage is applied, while they are aligned substantially horizontally when a voltage is applied (Japanese Patent Application Laid-Open No. 2-176625); (2) a MVA-mode liquid crystal cell obtained by introducing multi-domain switching of liquid crystal into a VA-mode liquid crystal cell to obtain wider viewing angle, (SID 97, Digest of Tech. Papers (Proceedings) 28 (1997) 845), (3) a n-ASM-mode liquid crystal cell where rod-shaped liquid crystalline molecules undergo substantially vertical orientation when no voltage is applied, while they undergo twisted multi-domain orientation when a voltage is applied (Proceedings 58 to 59 (1998), Symposium, Japanese Liquid Crystal Society); and (4) a SURVAIVAL-mode liquid crystal cell (reported in LCD international 98).

(IPS-Mode Liquid Crystal Display Devices)

IPS-mode liquid crystal cells are characterized in that in the cells, rod-shaped liquid crystalline molecules are aligned substantially horizontally in plane when no voltage is applied and switching is performed by changing the orientation direction of the crystal in accordance with the presence or absence of application of voltage. Specific examples of IPS-mode liquid crystal cells applicable include those described in Japanese Patent Application Laid-Open Nos. 2004-365941, 2004-12731, 2004-215620, 2002-221726, 2002-55341 and 2003-195333.

(Other Modes of Liquid Crystal Display Devices)

In ECB-mode, STN (Supper Twisted Nematic)-mode, optical compensation can also be achieved with the above described logic.

(iii) Providing Antireflection Layer (Antireflection Film)

Generally an antireflection film is made up of: a low-refractive-index layer which also functions as a stainproof layer; and at least one layer having a refractive index higher than that of the low-refractive-index layer (i.e. high-refractive-index layer and/or intermediate-refractive-index layer) provided on a transparent substrate.

Methods of forming a multi-layer thin film as a laminate of transparent thin films of inorganic compounds (e.g. metal oxides) having different refractive indices include: chemical vapor deposition (CVD); physical vapor deposition (PVD); and a method in which a film of a colloid of metal oxide particles is formed by sol-gel process from a metal compound such as a metal alkoxide and the formed film is subjected to post-treatment (ultraviolet light irradiation: Japanese Patent Application Laid-Open No. 9-157855, plasma treatment: Japanese Patent Application Laid-Open No. 2002-327310).

On the other hand, there are proposed a various antireflection films, as highly productive antireflection films, which are formed by coating thin films of a matrix and inorganic particles dispersing therein in a laminated manner.

There is also provided an antireflection film including an antireflection layer provided with anti-glare properties, which is formed by using an antireflection film formed by coating as described above and providing the outermost surface of the film with fine irregularities.

The cellulose acylate film of the present invention is applicable to antireflection films formed by any of the above described methods, but particularly preferable is the antireflection film formed by coating (coating type antireflection film).

(iii-1) [Layer Configuration of Coating-Type Antireflection Film]

An antireflection film having at least on its substrate a layer construction of: intermediate-refractive-index layer, high-refractive-index layer and low-refractive-index layer (outermost layer) in this order is designed to have a refractive index satisfying the following relationship.

Refractive index of high-refractive-index layer>refractive index of intermediate-refractive-index layer>refractive index of transparent substrate>refractive index of low-refractive-index layer, and a hard coat layer may be provided between the transparent substrate and the intermediate-refractive-index layer.

The antireflection film may also be made up of: intermediate-refractive-index hard coat layer, high-refractive-index layer and low-refractive-index layer.

Examples of such antireflection films include: those described in Japanese Patent Application Laid-Open Nos. 8-122504, 8-110401, 10-300902, 2002-243906 and 2000-111706. Other functions may also be imparted to each layer. There are proposed, for example, antireflection films that include a stainproofing low-refractive-index layer or antistatic high-refractive-index layer (e.g. Japanese Patent Application Laid-Open Nos. 10-206603 and 2002-243906).

The haze of the antireflection film is preferably 5% or less and more preferably 3% or less. The strength of the film is preferably H or higher, by pencil hardness test in accordance with JIS K5400, more preferably 2H or higher, and most preferably 3H or higher.

(iii-2) [High-Refractive-Index Layer and Intermediate-Refractive-Index Layer]

The layer of the antireflection film having a high refractive index consists of a curable film that contains: at least ultra-fine particles of high-refractive-index inorganic compound having an average particle size of 100 nm or less; and a matrix binder.

Fine particles of high-refractive-index inorganic compound include: for example, those of inorganic compounds having a refractive index of 1.65 or more and preferably 1.9 or more. Specific examples of such inorganic compounds include: oxides of Ti, Zn, Sb, Sn, Zr, Ce, Ta, La or In; and composite oxides containing these metal atoms.

Methods of forming such ultra-fine particles include: for example, treating the particle surface with a surface treatment agent (e.g. a silane coupling agent, Japanese Patent Application Laid-Open Nos. 11-295503, 11-153703, 2000-9908, an anionic compound or organic metal coupling agent, Japanese Patent Application Laid-Open No. 2001-310432 etc.); allowing particles to have a core-shell structure in which a core is made up of high-refractive-index particle(s) (Japanese Patent Application Laid-Open No. 2001-166104 etc.); and using a specific dispersant together (Japanese Patent Application Laid-Open No. 11-153703, U.S. Pat. No. 6,210,858B1, Japanese Patent Application Laid-Open No. 2002-2776069, etc.).

Materials used for forming a matrix include: for example, conventionally known thermoplastic resins and curable resin films.

Further, as such a material, at least one composition is preferable which is selected from the group consisting of: a composition including a polyfunctional compound that has at least two radically polymerizable and/or cationically polymerizable group; an organic metal compound containing a hydrolytic group; and a composition as a partially condensed product of the above organic metal compound. Examples of such materials include: compounds described in Japanese Patent Application Laid-Open Nos. 2000-47004, 2001-315242, 2001-31871 and 2001-296401.

A curable film prepared using a colloidal metal oxide obtained from the hydrolyzed condensate of metal alkoxide and a metal alkoxide composition is also preferred. Examples are described in Japanese Patent Application Laid-Open No. 2001-293818.

The refractive index of the high-refractive-index layer is generally 1.70 to 2.20. The thickness of the high-refractive-index layer is preferably 5 nm to 10 μm and more preferably 10 nm to 1 μm.

The refractive index of the intermediate-refractive-index layer is adjusted to a value between the refractive index of the low-refractive-index layer and that of the high-refractive-index layer. The refractive index of the intermediate-refractive-index layer is preferably 1.50 to 1.70.

(iii-4) [Low-Refractive-Index Layer]

The low-refractive-index layer is formed on the high-refractive-index layer sequentially in the laminated manner. The refractive index of the low-refractive-index layer is 1.20 to 1.55 and preferably 1.30 to 1.50.

Preferably, the low-refractive-index layer is formed as the outermost layer having scratch resistance and stainproofing properties. As means of significantly improving scratch resistance, it is effective to provide the surface of the layer with slip properties, and conventionally known thin film forming means that includes introducing silicone or fluorine is used.

The refractive index of the fluorine-containing compound is preferably 1.35 to 1.50 and more preferably 1.36 to 1.47. The fluorine-containing compound is preferably a compound that includes a crosslinkable or polymerizable functional group containing fluorine atom in an amount of 35 to 80% by mass.

Examples of such compounds include: compounds described in Japanese Patent Application Laid-Open No. 9-222503, columns [0018] to [0026], Japanese Patent Application Laid-Open No. 11-38202, columns [0019] to [0030], Japanese Patent Application Laid-Open No. 2001-40284, columns [0027] to [0028], Japanese Patent Application Laid-Open No. 2000-284102, etc.

A silicone compound is preferably such that it has a polysiloxane structure, it includes a curable or polymerizable functional group in its polymer chain, and it has a crosslinking structure in the film. Examples of such silicone compounds include: reactive silicone (e.g. SILAPLANE manufactured by Chisso Corporation); and polysiloxane having a silanol group on each of its ends (one described in Japanese Patent Application Laid-Open No. 11-258403).

The crosslinking or polymerization reaction for preparing such fluorine-containing polymer and/or siloxane polymer containing a crosslinkable or polymerizable group is preferably carried out by radiation of light or by heating simultaneously with or after applying a coating composition for forming an outermost layer, which contains a polymerization initiator, a sensitizing agent, etc.

A sol-gel cured film is also preferable which is obtained by curing the above coating composition by the condensation reaction carried out between an organic metal compound, such as silane coupling agent, and silane coupling agent containing a specific fluorine-containing hydrocarbon group in the presence of a catalyst.

Examples of such films include: those of polyfluoroalkyl-group-containing silane compounds or the partially hydrolyzed and condensed compounds thereof (compounds described in Japanese Patent Application Laid-Open Nos. 58-142958, 58-147483, 58-147484, 9-157582 and 11-106704); and silyl compounds that contain "perfluoroalkyl ether" group as a fluoline-containing long-chain group (compounds described in Japanese Patent Application Laid-Open Nos. 2000-117902, 2001-48590 and 2002-53804).

The low-refractive-index layer can contain additives other than the above described ones, such as filler (e.g. low-refractive-index inorganic compounds whose primary particles have an average particle size of 1 to 150 nm, such as silicon dioxide (silica) and fluorine-containing particles (magnesium fluoride, calcium fluoride, barium fluoride); organic fine particles described in Japanese Patent Application Laid-Open No. 11-3820, columns [0020] to [0038]), silane coupling agent, slippering agent and surfactant.

When the low refractive index layer is located as an outermost layer, the low-refractive-index layer may be formed by vapor phase method (vacuum evaporation, spattering, ion plating, plasma CVD, etc.). From the viewpoint of reducing manufacturing costs, coating method is preferable.

The thickness of the low-refractive-index layer is preferably 30 to 200 nm, more preferably 50 to 150 nm, and most preferably 60 to 120 nm.

(iii-4) [Hard Coat Layer]

A hard coat layer is formed on the surface of a transparent support to provide physical strength to anti-reflective film, and particularly formed between the transparent support and the high refractive-index layer.

Preferably, the hard coat layer is formed by the crosslinking reaction or polymerization of compounds curable by light and/or heat. Preferred curable functional groups are photopolymerizable functional groups, and organic metal compounds having a hydrolytic functional group are preferably organic alkoxy silyl compounds.

Specific examples of such compounds include the same compounds as illustrated in the description of the high-refractive-index layer.

Specific examples of compositions that constitute the hard coat layer include: those described in Japanese Patent Application Laid-Open Nos. 2002-144913, 2000-9908 and WO 0/46617.

The hard coat layer can also serves as an anti-glare layer (described later), if particles having an average particle size of 0.2 to 10 μm are added to provide the layer with the anti-glare function.

The thickness of the hard coat layer can be properly designed depending on the applications for which it is used. The thickness of the hard coat layer is preferably 0.2 to 10 μm and more preferably 0.5 to 7 μm.

The strength of the hard coat layer is preferably H or higher, by pencil hardness test in accordance with JIS K5400, more preferably 2H or higher, and much more preferably 3H or higher. The hard coat layer having a smaller abrasion loss in test, before and after Taber abrasion test conducted in accordance with JIS K5400, is more preferable.

(iii-5) [Forward Scattering Layer]

A forward scattering layer is provided so that it provides, when applied to liquid crystal displays, the effect of improving viewing angle when the angle of vision is tilted up-, down-, right- or leftward. The above described hard coat layer can also serve as a forward scattering layer, if fine particles with different refractive index are dispersed in it.

Example of such layers include: those described in Japanese Patent Application Laid-Open No. 11-38208 where the coefficient of forward scattering is specified; those described in Japanese Patent Application Laid-Open No. 2000-199809 where the relative refractive index of transparent resin and fine particles are allowed to fall in the specified range; and those described in Japanese Patent Application Laid-Open No. 2002-107512 wherein the haze value is specified to 40% or higher.

(iii-6) [Other Layers]

Besides the above described layers, a primer layer, antistatic layer, undercoat layer or protective layer may be provided.

(iii-7) [Coating Method]

The layers of the antireflection film can be formed by any method of dip coating, air knife coating, curtain coating, roller coating, wire bar coating, gravure coating, microgravure coating and extrusion coating (U.S. Pat. No. 2,681,294).

(iii-8) [Anti-Glare Function]

The antireflection film may have the anti-glare function that scatters external light. The anti-glare function can be obtained by forming irregularities on the surface of the antireflection film. When the antireflection film has the anti-glare function, the haze of the antireflection film is preferably 3 to 30%, more preferably 5 to 20%, and most preferably 7 to 20%.

As a method for forming irregularities on the surface of antireflection film, any method can be employed, as long as it can maintain the surface geometry of the film. Such methods include: for example, a method in which fine particles are used in the low-refractive-index layer to form irregularities on the surface of the film (e.g. Japanese Patent Application Laid-Open No. 2000-271878); a method in which a small amount (0.1 to 50% by mass) of particles having a relatively large size (0.05 to 2 μm in particle size) are added to the layer under a low-refractive-index layer (high-refractive-index layer, intermediate-refractive-index layer or hard coat layer) to form a film having irregularities on the surface and a low-refractive-index layer is formed on the irregular surface while keeping the geometry (e.g. Japanese Patent Application Laid-Open Nos. 2000-281410, 2000-95893, 2001-100004, 2001-281407); a method in which irregularities are physically transferred on the surface of the outermost layer (stainproofing layer) having been provided (e.g. embossing described in Japanese Patent Application Laid-Open Nos. 63-278839, 11-183710, 2000-275401).

In the following the measurement methods used in the present invention will be described.

[1] Methods for Measuring Re and Rth

A sample film is conditioned in humidity at a temperature of 25° C. and a humidity of 60% rh for at least 3 hours. Then, with an automatic birefringence meter (Kobra-21ADH/PR manufactured by Oji Scientific Instruments Co., Ltd.), the retardation value of the sample film at a wavelength of 550 nm is measured at 25° C. and 60% rh, in a direction normal to the surface of the sample film and in a direction inclined by ±40° from the normal of the film surface. The in-plane retardation (Re) is derived from the measured value for the normal direction, and the thickness direction retardation (Rth) is derived from the measured values in the normal direction and the direction inclined by ±40° from the normal of the film surface.

[2] Re, Rth, and Transverse and Longitudinal Fluctuations of Re and Rth (1) MD Direction Sampling In the longitudinal direction of the film, 1-cm-side squares are cut out at 100 positions with an interval of 0.5 m.

(2) TD Direction Sampling

Along the whole width of the film, 1-cm-side squares are cut out at 50 positions with an even interval.

(3) Measurement of Re and Rth

A sample film is conditioned in humidity at a temperature of 25° C. and a humidity of 60% rh for at least 3 hours. Then, with an automatic birefringence meter (Kobra-21ADH/PR manufactured by Oji Scientific Instruments Co., Ltd.), the retardation value of the sample film at a wavelength of 550 nm is measured at 25° C. and 60% rh, in a direction normal to the surface of the sample film and in a direction inclined by ±40° from the normal of the film surface. The in-plane retardation (Re) is derived from the measured value for the normal direction, and the thickness direction retardation (Rth) is derived from the measured values in the normal direction and the direction inclined by ±40° from the normal of the film surface.

Each of Re and Rth is defined as the average value over all the above described sampling positions concerned.

(4) Fluctuations of Re and Rth

The fluctuation of Re is derived by dividing the difference between the maximum and minimum values of all of the 100 sampling position values associated with the MD direction by the average value of these 100 values and by presenting the thus obtained quotient in terms of percents; and the fluctuation of Rth is derived in the same manner as above except that the 50 sampling position values associated with the TD direction are used in place of the 100 sampling position values associated with the MD direction.

[3] Elongation at Break Based on Stretching with Tensiron

A heating type Tensiron manufactured by Toyo Seiki is used; each sample is preheated for 1 minute in an oven heated to Tg+10° C., Tg being the glass transition temperature of the sample; thereafter, the sample is stretched until it is broken to obtain the elongation at break under the conditions that the separation between the chucks is 100 mm and a stretching speed is 100 mm/min.

[4] Substitution Degrees in Cellulose Acylate

The substitution degrees of the acyl groups in the cellulose acylate are obtained through $^{13}$C-NMR according to the method described in Carbohydr. Res., 273 (1955) 83-91 (Tezuka, et al.).

[5] Peak Heat Amount in DSC Crystal Melting

A DSC apparatus, DSC-50, manufactured by Shimadzu Seisakusho is used; measurement is made at a temperature increasing rate of 10° C./min; the heat amount of the heat absorption peak to occur immediately after Tg is derived in units of J/g, and Tg is also measured at the same time.

[6] Haze Value

The haze value is measured with a turbidity meter NDH-1001DP manufactured by Nippon Denshoku Kogyo Co., Ltd. is used.

[7] Yellowness Index (YI Value)

The yellowness (YI: yellowness index) is measured with Z-II OPTICAL SENSOR according to JIS K7105 6.3.

A reflection method is applied to pellets and a transmission method is applied to films; the tristimulus values X, Y and Z are measured; the YI value is derived from the tristimulus values X, Y and Z on the basis of the following formula:

$$YI=\{(1.28X-1.06Z)/Y\}\times 100$$

Each of the YI values for films derived from the above formula is divided by the film thickness to be converted into a value per 1 mm; these converted values are used for comparison.

[8] Molecular Weight

Film samples are dissolved in dichloromethane and the molecular weights are measured with GPC.

EXAMPLES

Cellulose Acylate Resin

The cellulose acylates different from each other in the types and the substitution degrees of the acyl groups described in Table 1 (FIG. 3) were prepared. In the preparation, acylation reaction was carried out at 40° C. with sulfuric acid added as catalyst (7.8 parts by weight in relation to 100 parts by weight of the cellulose) and carboxylic acids added to be raw material of the acyl substituents; the types and the substitution degrees of the acyl groups were controlled by controlling the types and the amounts of the carboxylic acids; and on completion of the acylation, aging was carried out at 40° C. The Tg values of the cellulose acylates thus obtained were measured by means of the following method and listed in the table of FIG. 3. It is to be noted that the Tg values of the cellulose acylates added with a plasticizer are the values measured after addition of the plasticizer.

(Measurement of Tg)

On the measuring pan of a DSC apparatus, 20 mg of a sample was placed. In a gas flow of nitrogen, the sample was heated from 30° C. to 250° C. at a rate of 10° C./min (the first run), and then, cooled down to 30° C. at a rate of −10° C./min. Thereafter, the sample was again heated from 30° C. to 250° C. (the second run). The glass transition temperature (Tg) was defined as the temperature at which the base line started to deviate on the lower temperature side in the second run. The Tg values listed in Table 1 are based on this definition. To every sample, 0.05% by mass of silicon dioxide fine particles (Aerosil R972V) was added.

[Melt Film Forming]

The above described cellulose acylate resins were shaped into columnar pellets of 3 mm in diameter and 5 mm in length. In the pelletization, a 2% by weight of a plasticizer, namely, TPP (triphenyl phosphate) was blended. Each of the pelletized resins was dried in a vacuum dryer set at 110° C. to make the moisture content thereof be 0.1% or less, then controlled to have a temperature of Tg−10° C., and thereafter placed in the hopper.

The melting temperature was controlled so as for the melt viscosity to be 1000 Pass; the palletized resin was melted in a uniaxial extruder 22 set at 210° C.; the molten resin was extruded in the form of s sheet from the T-shaped die 24 set at the same temperature as the melting temperature between the polishing roller 26 of 300 mm in diameter and the polishing roller 28 of 300 mm in diameter, both roller being set at Tg−5° C., and cooled and solidified to yield a cellulose acylate film. The temperature of each of the rollers, the gap between the rollers and the surface roughness of each of the rollers were as shown in Table 1. The solidified sheet was peeled off from the polishing roller 28 and was wound up in the form of a roll. Immediately before winding up, the both edges of the sheet was trimmed (by 3% of the total width for each edge), and then the both ends were subjected to thickening (knurling) to a width of 10 mm and a height of 50 ρm. Every sheet was wound up to a length of 3000 m having a width of 1.5 mat a winding up speed of 30 m/min.

[Stretching]

Each of the cellulose acylate films produced by the melt film-forming was preheated with a preheating roll, and then stretched at the temperature and the longitudinal and transverse stretching magnifications listed in Table 1. In Table 1, for each of the resins of Examples and Comparative Examples, the stretching temperature is shown as "relative to Tg" in terms of the plus or minus deviation, indicated with + or − sign, from Tg of the resin concerned. The longitudinal stretching and the transverse stretching of each of the resin were carried out at the same temperature, as listed in Table 1 under the heading of "Stretching temperature."

In Examples and Comparative Examples shown in Table 1, stretched cellulose acylate films were prepared using the cellulose acylate films produced under the film formation conditions described in Table 1, and the thus prepared stretched cellulose acylate films were subjected to quality evaluation. As the quality evaluation items for the stretched cellulose acylate films, there were adopted Re and the fluctuation rate thereof, Rth and the fluctuation rate thereof, the haze value, the YI value and the film thickness.

[Quality Evaluation of Stretched Cellulose Acylate films]

The film formation conditions, the stretching conditions and the successful quality values of the stretched cellulose acylate films listed in the top row of the table of FIG. 3 are as follows:

| | |
|---|---|
| Screw compression ratio of the extruder: | from 2.5 to 4.5 |
| L/D of the extruder: | from 20 to 50 |
| Extrusion temperature: | from 190 to 240° C. |
| Preheating temperature for longitudinal stretching: | from Tg − 40° C. to Tg + 60° C. |
| Stretching magnification of the longitudinal stretching: | from 1.01 to 3.0 |
| Stretching magnification of the transverse stretching: | from 1.0 to 2.5 |
| Magnitude of the DSC heat absorption peak: | 4.0 J/g or less |
| Re: | 0 nm or more and 500 nm or less |
| Fluctuation rate of Re: | 5% or less |
| Rth: | 30 nm or more and 500 nm or less |
| Fluctuation rate of Rth: | 5% or less |
| Haze value: | 2% or less |
| YI value: | 10 or less |
| Film thickness: | from 30 to 300 μm |

As can be seen from Table 1, Test 11 adopting the conventional casting drum method suffered significant streaks generation, but Tests 1 to 10 adopting the touch roll method (the polishing roller method) attained the results that the streaks generation was able to be inhibited. However, Tests 4 to 7 deviated in the substitution degree and molecular weight from the above described, predetermined ranges, and were consequently degraded in melt film formability. Test 8 exceeded 2.5 in transverse stretching magnification, and was consequently given a large haze value. Tests 9 and 10 exceeded 100 nm in surface roughness, and each were consequently given a large haze value.

[Fabrication of Sheet Polarizer]

(1) Surface Treatment

After stretching, the stretched cellulose acylate films were saponified according to any one of the following methods.

(i) Coating Saponification

To 80 parts by weight of iso-propanol, 20 parts by weight of water was added, and KOH was dissolved therein so as to become 1.5 N. The solution was controlled in temperature to be set at 60° C., which solution was used as a saponifying solution. The saponifying solution was coated on a cellulose acylate film set at 60° C. in a coating amount of 10 g/m² to saponify the film for 1 minute. On completion of the saponification, the film was washed by spraying warm water set at 50° C. onto the film for 1 minute by use of a spray at a flow rate of 10 L/m² min.

(ii) Soaking Saponification

A 1.5N aqueous solution of NaOH was used as a saponifying solution. The solution was controlled in temperature to be set at 60° C., and a cellulose acylate film was soaked therein for 2 minutes. Thereafter, the film was soaked in a 0.1 N aqueous solution of sulfuric acid for 30 seconds, and then passed through a water washing bath.

(2) Preparation of Polarizing Layer

According to Example 1 of Japanese Patent Laid-Open No. 2001-141926, a film was stretched in the longitudinal direction by applying a difference in peripheral speed between two pairs of niprolls to prepare a 20 μm thick polarizing layer. Here, two polarizing layers were prepared: one was a polarizing layer immediately after the film formation and stretching, and the other was a polarizing layer aged at 80° C. for 1 month after preparation. The stretched polarizing layers were also prepared for which the stretching axis direction was inclined by 45 degrees similarly to Example 1 of Japanese Patent Laid-Open No. 2002-86554, and the results of the below described evaluation of these polarizing layers were the same as those of the above described polarizing layers.

(3) Laminating

Each of the thus obtained polarizing layer (fresh polarizing layer) immediately after stretching and the thus obtained polarizing layer (aged polarizing layer) aged at 80° C. for 1 month was sandwiched between a stretched cellulose acylate film (phase difference plate) subjected to the above described saponification treatment and a sheet polarizer protecting film (trade name: Fujitac) subjected to a saponification treatment. In this laminating, adhesion between the phase difference plate and the polarizing layer was carried out with a 3% aqueous solution of PVA (trade name: PVA-117H; manufactured by Kuraray Co., Ltd.) as an adhesive when the phase difference plate is made of a cellulose acylate, and with an epoxy adhesive when the phase difference plate is made of a material other than a cellulose acylate; adhesion between the Fujitac and the polarizing layer was carried out with the above described aqueous solution of PVA as an adhesive. The laminating direction was such that the angle between the polarization axis and the longitudinal direction of the phase difference plate was 45 degrees. The thus obtained sheet polarizer was installed in a 20 inch VA type liquid crystal display device described in FIGS. 2 to 9 of Japanese Patent Laid-Open No. 2000-154261 in such a way that the phase difference plate was disposed on the liquid crystal side and the Fujitac was disposed outside (viewing side). Such an installed polarized plate was fabricated for each of the sheet polerizers made of the fresh polarizing layer and the aged polarizing layer. The thus fabricated liquid crystal display devices were compared with each other for evaluation by visual inspection with respect to ratio of the color nonuniformity generation area to the whole area, and consequently the display device to which the present invention was applied attained satisfactory performance.

[Preparation of Optical Compensation Films]

In place of the cellulose acetate film coated with a liquid crystal layer in Example 1 of Japanese Patent Laid-Open No. 11-316378, a stretched cellulose acylate film of the present invention was used. Here, two types of compensation films were prepared: one in which used was a film (fresh film) immediately after the film formation and stretching, and the other in which used was a film (aged film) aged at 80° C. for 1 month after preparation. The thus prepared compensation films were compared with each other for evaluation by visual inspection with respect to ratio of the color nonuniformity generation area to the whole area, and the evaluation result was presented in terms of this ratio. Consequently, satisfactory were the optical compensation films made with the stretched cellulose acylate films based on the cellulose acylate film of the present invention.

A satisfactory optical compensation film was able to be prepared as an optical compensation filter film prepared with the stretched cellulose acylate film of the present invention in place of the cellulose acetate film coated with a liquid crystal layer in Example 1 of Japanese Patent Laid-Open No. 7-333433.

Those optical compensation films falling outside the scope of the present invention were degraded in optical properties. In particular, the optical compensation film according to Example 1 of Japanese Patent Laid-Open No. 2002-311240 was remarkably degraded in optical properties.

[Preparation of Low Reflection Films]

The stretched cellulose acylate film of the present invention was used to prepare a low reflection film according to Example 47 of Hatsumei Kyokai Kokai Giho (Ko-Gi No. 2001-1745), resulting in excellent optical performances.

[Preparation of Liquid Crystal Display Elements]

The aforementioned sheet polarizers of the present invention were applied to the liquid crystal display devices described in Example 1 of Japanese Patent Laid-Open No. 10-48420, the optical anisotropy layers containing discotic liquid crystal molecules described and the oriented films coated with polyvinyl alcohol in Example 1 of Japanese Patent Laid-Open No. 9-26572, the 20 inch-VA type liquid crystal display devices described in FIGS. 2 to 9 of Japanese Patent Laid-Open No. 2000-154261, the 20 inch-OCB type liquid crystal display devices described in FIGS. 10 to 15 of Japanese Patent Laid-Open No. 2000-154261, and the IPS type liquid crystal display device described in FIG. 11 of Japanese Patent Laid-Open No. 2004-12731. Further, the low reflection films of the present invention were applied to the outermost layer of these liquid crystal display devices to evaluate the performances thereof. Consequently, satisfactory liquid crystal display elements were able to be obtained.

The invention claimed is:

1. A method for producing a cellulose acylate film, comprising:
   a film formation section in which a molten resin that melt-extruded a molten cellulose acylate resin from an extruder is extruded from a die in a form of a sheet, and a film is formed by sandwiching the resin between a pair of rollers each having such surface properties that an arithmetic average roughness Ra is 100 nm or less to cool and solidify the resin; and
   a stretching section in which the film formed in the film formation section is stretched at least in one of a longitudinal direction and a transverse direction by a factor of 1 or more than 1 and 2.5 or less,
   wherein the cellulose acylate resin has a number average molecular weight of 20,000 to 80,000, and
   the substitution degrees of the acyl groups satisfy the relations $2.0 \leq A+B \leq 3.0$, $0 \leq A \leq 2.0$ and $1.5 \leq B \leq 2.9$, where A represents the substitution degree of the acetyl group and B represents the total sum of the substitution degrees of the acyl groups each having 3 to 7 carbon atoms, and
   extrusion conditions of the extruder has the screw compression ratio set to 2.5 to 4.5, L/D set to 20 to 50 showing the ratio of the length (L) to the inside diameter (D) of the cylinder, and extrusion temperature set to 190 to 240° C.

2. The method for producing a cellulose acylate film according to claim 1, wherein the film thickness is 30 to 300 µm, the in-plane retardation Re is 0 nm or more and 500 nm or less, and the thickness direction retardation Rth is 30 nm or more and 500 nm or less.

* * * * *